(12) United States Patent
Zaloom

(10) Patent No.: US 10,253,536 B1
(45) Date of Patent: *Apr. 9, 2019

(54) COMPACT BIPOSITIONAL MULTI-LOCKING LOAD BEARING ROTATION LOCK MECHANISM

(71) Applicant: Joseph Zaloom, Falls Church, VA (US)

(72) Inventor: Joseph Zaloom, Falls Church, VA (US)

(73) Assignee: Joseph A. Zaloom, Falls Church, VA (US)

( * ) Notice: Subject to any disclaimer, the term of this patent is extended or adjusted under 35 U.S.C. 154(b) by 40 days.

This patent is subject to a terminal disclaimer.

(21) Appl. No.: 15/230,165

(22) Filed: Aug. 5, 2016

Related U.S. Application Data

(63) Continuation-in-part of application No. 14/952,595, filed on Nov. 25, 2015, now Pat. No. 9,933,009, which is a continuation-in-part of application No. 14/874,713, filed on Oct. 5, 2015, now Pat. No. 9,506,281, which is a continuation of application No. 14/488,054, filed on Sep. 16, 2014, now Pat. No. 9,483,083, which is a continuation-in-part of application No. 14/255,711, filed on Apr. 17, 2014, now Pat. No. 9,596,914, and a continuation-in-part of
(Continued)

(51) Int. Cl.
*E05D 11/10* (2006.01)

(52) U.S. Cl.
CPC ...... *E05D 11/1007* (2013.01); *E05D 11/1078* (2013.01); *E05D 2011/1035* (2013.01); *E05Y 2900/606* (2013.01)

(58) Field of Classification Search
CPC . E05D 11/06; E05D 11/1078; E05D 11/1007; Y10T 16/540254; Y10T 16/540255; Y10T 16/540247; Y10T 16/54025; Y10T 16/540253; Y10T 16/54024; Y10T 16/5402; Y10T 16/54; Y10T 16/540256; Y10T 16/540257; Y10T 16/54026
See application file for complete search history.

(56) References Cited

U.S. PATENT DOCUMENTS

| | | | |
|---|---|---|---|
| 1,166,702 A | * | 1/1916 | Mardon et al. ..... E05D 11/1078 16/329 |
| 2,101,500 A | | 12/1937 | Jagus |

(Continued)

OTHER PUBLICATIONS

"Computer Components & Imaging Supplies", Crimson Imaging Supplies, Mar. 15, 2013, two pages.
(Continued)

*Primary Examiner* — Victor D Batson
*Assistant Examiner* — Matthew J Sullivan

(57) ABSTRACT

A releasable locking hinge assembly having: a shaft including a first locking region with multiple faceted sides on an outer circumference of the shaft, and a partial or complete hollow cylinder coaxial with and receiving the shaft, wherein the hollow cylinder includes a second locking region with multiple faceted sides on an inner wall of the cylinder, wherein the first locking region and second locking region are configured to slidably engage; and wherein the locking regions slidably engage, they lock the angular position of the locking hinge, and where they slidably disengage, they allow the locking hinge to pivot.

12 Claims, 33 Drawing Sheets

Related U.S. Application Data application No. 14/255,711, filed on Apr. 17, 2014, now Pat. No. 9,596,914.

(60) Provisional application No. 62/211,085, filed on Aug. 28, 2015, provisional application No. 62/064,216, filed on Oct. 15, 2014, provisional application No. 62/060,353, filed on Oct. 6, 2014, provisional application No. 61/906,878, filed on Nov. 20, 2013, provisional application No. 61/878,491, filed on Sep. 16, 2013, provisional application No. 61/813,893, filed on Apr. 19, 2013.

(56) References Cited

U.S. PATENT DOCUMENTS

| | | | |
|---|---|---|---|
| 3,744,085 A * | 7/1973 | Griego | E05D 11/1007 16/325 |
| 4,436,271 A | 3/1984 | Manso | |
| 5,020,763 A | 6/1991 | Hegarty | |
| 5,058,648 A | 10/1991 | Ferraro | |
| 5,060,904 A | 10/1991 | Hegarty | |
| 5,074,164 A * | 12/1991 | Sheu | E05D 11/1007 16/349 |
| 5,100,098 A | 3/1992 | Hawkins | |
| 5,168,601 A * | 12/1992 | Liu | B62B 9/20 16/329 |
| 5,933,996 A | 8/1999 | Chang | |
| 6,367,760 B1 | 4/2002 | Pagano | |
| 6,983,514 B2 | 1/2006 | Lu et al. | |
| 7,083,155 B1 | 8/2006 | Smartt | |
| 7,188,818 B2 | 3/2007 | Chang | |
| 7,546,996 B2 | 6/2009 | Somji | |
| 7,568,915 B1 | 8/2009 | Lavoie | |
| 7,581,290 B2 | 9/2009 | Chang | |
| 7,591,604 B2 * | 9/2009 | Roberts | B25F 5/02 16/326 |
| 7,611,117 B1 | 11/2009 | Lang, Jr. | |
| 7,712,719 B2 | 5/2010 | Derry et al. | |
| 7,770,862 B2 | 8/2010 | Chen | |
| 7,836,623 B2 | 11/2010 | Wang et al. | |
| 8,038,116 B2 | 10/2011 | Lee et al. | |
| 8,118,274 B2 | 2/2012 | McClure et al. | |
| D672,783 S | 12/2012 | Robinson | |
| 8,382,059 B2 | 2/2013 | LeGette et al. | |
| 8,387,930 B2 | 3/2013 | Drew et al. | |
| 8,833,716 B2 | 9/2014 | Funk et al. | |
| 9,933,009 B1 * | 4/2018 | Zaloom | A45C 13/36 |
| 2004/0007649 A1 | 1/2004 | Vettraino | |
| 2005/0155183 A1 | 7/2005 | Lu et al. | |
| 2006/0084585 A1 | 4/2006 | Lin | |
| 2006/0137491 A1 * | 6/2006 | Chen | B25B 13/461 81/58 |
| 2006/0175484 A1 | 8/2006 | Wood, III et al. | |
| 2008/0156836 A1 | 7/2008 | Wadsworth et al. | |
| 2011/0094058 A1 * | 4/2011 | Van Gennep | E05D 11/1007 16/327 |
| 2012/0074272 A1 | 3/2012 | Hull | |
| 2012/0111881 A1 | 5/2012 | Gaddis, II et al. | |
| 2012/0126088 A1 | 5/2012 | Whittaker et al. | |
| 2012/0326003 A1 | 12/2012 | Solow et al. | |
| 2013/0092805 A1 | 4/2013 | Funk et al. | |
| 2013/0092811 A1 | 4/2013 | Funk et al. | |
| 2013/0233984 A1 | 9/2013 | Huang | |
| 2013/0256478 A1 | 10/2013 | Reda et al. | |
| 2013/0277520 A1 | 10/2013 | Funk et al. | |
| 2014/0054426 A1 | 2/2014 | Burns | |
| 2014/0063750 A1 * | 3/2014 | Mau | G06F 1/1601 361/728 |
| 2014/0116230 A1 | 5/2014 | Nakata et al. | |
| 2014/0259532 A1 * | 9/2014 | Millard | E05D 11/1028 16/326 |
| 2014/0328020 A1 | 11/2014 | Galant | |
| 2014/0346311 A1 | 11/2014 | Derman | |

OTHER PUBLICATIONS

"Ipad/Tablet Holding Products—Galaxy Tab Stand, Ipad Leg Strap, Nook Holder @ Hand e Holder", www.handholder.com, Mar. 15, 2013, four pages.

"HandyShell for iPad, iPad Cases & Covers/SpeckProducts", Mar. 15, 2013, two pages.

Detachable Metal Stand for iPad, Cell Phone, Smartphone, Tablet Accessories/iKross, Mar. 15, 2013, two pages.

"Life-Phorm All-in-One Positioning Device for iPad 3, iPad 4, Tablets, Smartphones and Cameras (000LIF)", Amazon.com: Life-Phorm All-in-One Positioning Device for iPad 3, iPad 4, Tablets, Smartphones and Cameras (000LIF): Computers & Accessories, Apr. 18, 2013, four pages.

"Stabile Coil PRO—Flexible Gooseneck Coil Based Pivoting iPad Stand—iPad 4g, 3g, iPad 2 and 1g", Stabile Coil PRO Flexible Gooseneck Coil Pivoting iPad 4g, 3g, iPad 2 and iPad Stand Holder, Apr. 18, 2013, four pages.

"Buzz / ZeroChromaZeroChroma", Mar. 15, 2013, twelve pages.

* cited by examiner

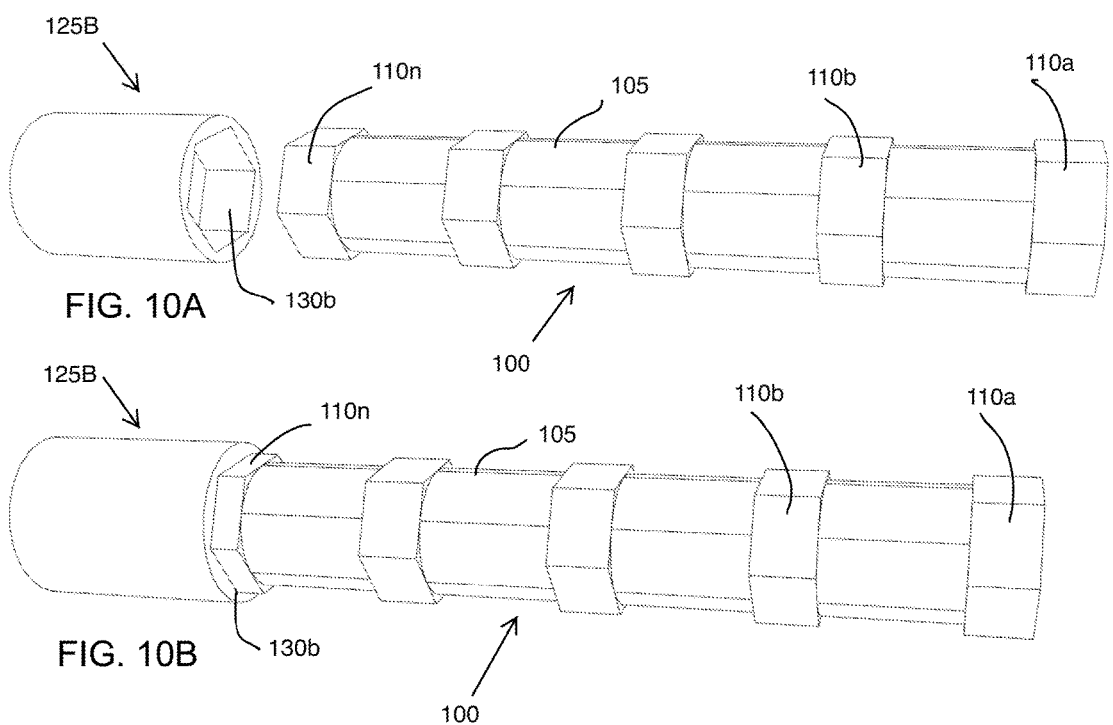

COMPACT BIPOSITIONAL MULTI-LOCKING LOAD BEARING ROTATION LOCK MECHANISM

CROSS-REFERENCES TO RELATED APPLICATIONS

This application claims the benefit of U.S. Provisional Application 62/211,085 filed Aug. 28, 2015, and is a continuation-in-part (CIP) of U.S. patent application Ser. No. 14/952,595 filed Nov. 25, 2015, which is a CIP of U.S. patent application Ser. No. 14/874,713, filed Oct. 5, 2015 which claims the benefit of U.S. Provisional Applications 62/064,216 filed Oct. 15, 2014 and 62/060,353 filed Oct. 6, 2014 and which is a continuation of U.S. patent application Ser. No. 14/488,054 filed Sep. 16, 2014 which claims the benefit of U.S. Provisional Patent Application 61/906,878 filed Nov. 20, 2013 and is a CIP of U.S. patent application Ser. No. 14/255,711, filed Apr. 17, 2014, which claims the benefits of U.S. Provisional Application 61/878,491 filed Sep. 16, 2013, and U.S. Provisional Application 61/813,893 filed Apr. 19, 2013, all of which applications are incorporated by reference in their entireties.

FIELD OF INVENTION

This technology relates to thin, light, compact, sturdy, and inexpensive mechanisms for locking and unlocking the rotation of load bearing hinges at multiple specific angles. More particularly, the technology herein relates to the discrete angular positioning and support of the load and the pressure of a human hand pressing a stylus against the display surface of a tablet at multiple viewing and writing angles, among other applications.

BACKGROUND OF THE INVENTION

Thirty-five years ago, with the introduction of the original IBM PC in August of 1981, IBM permanently detached the keyboard from the computer case for all modern desktop computers. Yet, the great majority of today's laptop manufacturers continue to sell laptops that permanently hinge the keyboard to the display screen, with no way of separating the two. Also, six years after the introduction of the Apple iPad, which popularized touch-screen tablets, and three years after the release of the original Microsoft Surface Pro—which incorporated a high quality electronic stylus—practically all of today's tablet manufacturers do not provide a load bearing hinge that enables users to comfortably write on their display screens at a raised angle in order to eliminate annoying reflections and glare.

The absence of these capabilities from today's tablets and laptops can result in significant inefficiencies to the users. For example:

Laptop keyboards that are permanently hinged to the display panel typically result in a cramped typing experience, and a somewhat uncomfortable viewing experience where the distance from the eyes to the display panel is restricted by the distance of the typing hands to the keyboard.

The inability to unhinge a laptop display and to set it to the portrait orientation can be quite limiting when writing a letter or "facetiming" with another person were the portrait orientation typically provides the optimum viewing experience.

The inability to disassociate the screen of a laptop from the keyboard makes it impractical to use touch-screen laptops for hand-writing or for drawing; vastly limiting their usefulness.

The inability of the great majority of touch-screen laptops to fasten the angular position of their display screens to discreet angular positions invariably results in screen wobbling with every touch of the screen, which may be quite irritating to some users.

The hinged keyboards of today's laptops come almost invariably flush with the typing surface, resulting is a somewhat uncomfortable typing experience—unlike the raised detachable keyboards of most desktop computers.

Even when the touch-screen of a laptop can be made detachable from the keyboard, as in Microsoft's latest offerings of its Surface Book and Surface Pro computers, using an electronic stylus on an un-adjustable glass-faced touch-screen display that is flush with the supporting surface can quickly become quite uncomfortable in the presence of glare and uncontrollable reflections.

As mentioned above, Microsoft has recently taken the lead in the effort to detach the laptop's display screen from the keyboard with the introduction of the its Surface Book line of touch-screen tablets and laptops in October 2015, but these computers continue to suffer from a lack of a load bearing hinge that would enable users to write at a raised angle, to view the display screen in the Portrait orientation, and to eliminate wobbling when a user touches the screen. Microsoft's older Surface Pro line of tablets on the other hand does not wobble when the user touches the screen because the display has a built-in kickstand, but it cannot be used as a laptop, the display screen cannot to viewed in the Portrait orientation, and the display screen cannot be raised at an angle to eliminate reflections and glare for a more enjoyable writing experience.

Another detachable tablet keyboard worth mentioning is the Logitech Ultrathin Keyboard for the iPad. In the summer of 2014 Logitech introduced an ultrathin keyboard cover for the iPad that has an adjustable groove stand that lets users tilt their iPad, so that they can chose the viewing angle that's most comfortable for them. The device enables viewers to prop their iPad up between 50 and 70-degree viewing angles, just as they would with a laptop screen. However, the adjustable groove offers a quite stiff resistance, which is good for pushing the iPad back to a wider viewing angle and keeping it there. But pulling it back towards the viewer may be a bit awkward; the groove stand doesn't secure the iPad sufficiently to give the user enough leverage to pull it back smoothly, so one has to hold down the iPad while doing it. While the Logitech Ultrathin Keyboard cover does offer a choice of viewing angles, touching the screen can still result in wobbling, and the iPad continues to suffer from a lack of a load bearing hinge that would enable users to write at a raised angle, to view the display screen in the Portrait orientation, and to eliminate wobbling when a user touches the screen.

While touch-sensitive displays, and even detachable screens, are quickly becoming the norm in today's laptops, their wobbliness when attached to the keyboard, their lack of an inherent ability to be positioned to various angles and orientations with respect to a base, and their lack of a robust hinge that can support the load and the pressure of a human hand pressing a stylus against the display surface of the tablet at multiple viewing and writing angles, both for ergonomic reasons and to eliminate reflections and glare, vastly limit their usefulness, enjoyment, and effectiveness.

Therefore, a need exists for a simple, light, thin, robust, and inexpensive hinge that not only can support a relatively large number of adjustable viewing angles for an electronic tablet but that can also quickly unhinge, reorient, and re-hinge the display screen of a laptop from its keyboard, eliminate the wobbliness of today's touch-screen laptops, and support the load and the pressure of a human hand pressing a stylus against the display surface of a tablet at multiple viewing and writing angles.

SUMMARY OF THE INVENTION

I have invented and disclose herein a novel releasable locking assembly including a shaft having a first locking region with a plurality of two or more faceted sides on an outer circumference of the shaft, and a partial or complete hollow cylinder coaxial with and receiving the shaft, wherein the hollow cylinder includes a second locking region with a plurality of two or more faceted sides on an inner wall of the cylinder, wherein the first locking region and the second locking region are configured to slidably engage; and wherein the locking regions slidably engage, they lock the angular position of the locking hinge, and where they slidably disengage, they allow the locking hinge to pivot.

The releasable locking assembly may include a rotationally stationary cylindrical shaft and the snugly enveloping tube or hollow cylinder, where the enveloping tube or hollow cylinder is attached to a pivoting support element and the cylindrical shaft is attached to a fixed surface area, and where the surface of the cavity (the inner surface) of the tube or hollow cylinder that is attached to the pivoting element incorporates at least one multifaceted or toothed locking area that is configured to radially mesh and interlock with a matching multifaceted or toothed locking region on the cylindrical shaft around which it rotates and wherein the locking region on the shaft engages the locking area of the tube the pivoting support element that is attached to the tube is restricted from pivoting, and wherein the locking region on the shaft becomes disengaged from the locking area of the tube or hollow cylinder either by sliding the tube or hollow cylinder laterally over the stationary shaft, or by thrusting the rotationally stationary shaft through a laterally stationary tube or hollow cylinder, the pivoting support element that is attached to the tube or hollow cylinder becomes free to pivot and rotate around the cylindrical shaft.

Another embodiment of the invention is a load bearing rotation lock mechanism that revolves around a pivoting element located on or within a surface, wherein the element is movable between a retracted position and at least two extended positions relative to the surface. The element being disposed in the flush position against or within the surface in its retracted position and extending from the surface to provide orientation and support in its extended positions, and wherein the pivoting element is traversed by a tube or hollow cylinder that rotates snugly around a partial or complete stationary cylindrical shaft that is attached to a fixed surface area and that includes at least one multifaceted or toothed locking region.

The surface of the cavity of the tube or hollow cylinder that is attached to the pivoting element (the inner surface of the tube or hollow cylinder) incorporates at least one multifaceted or toothed locking area that is configured to radially mesh and interlock with a multifaceted or toothed locking region of the cylindrical shaft around which it rotates.

When the multifaceted or toothed locking area of the cavity of the tube or hollow cylinder that is attached to the pivoting element comes in contact with at least one multifaceted or toothed locking region on the outer surface of the cylindrical shaft that is attached to a fixed surface area, the meshing areas interlock and the tube or hollow cylinder and the pivoting element to which it is attached can no longer pivot around the cylindrical shaft that is attached to the fixed surface area.

When the cylindrical shaft that is attached to the fixed surface area and that is enclosed by the tube or hollow cylinder is made to be rotationally stationary and the tube or hollow cylinder that is attached to a pivoting element is thrust in a direction that aligns its multifaceted or toothed locking area with a multifaceted or toothed locking region that is located on the cylindrical shaft that is attached to the fixed surface area, the tube or hollow cylinder interlocks with the fixed cylindrical shaft and the support element that is attached to the tube or hollow cylinder is prevented from pivoting and is fixed in its rotational angular position with respect to the interlocking cylindrical shaft.

When the tube or hollow cylinder that is attached to a pivoting element is thrust in a direction that results in the complete disengagement of the radially locking multifaceted or toothed area that is on the inner surface of the tube or hollow cylinder and a multifaceted or toothed locking region that is located on the stationary cylindrical shaft that is attached to a fixed surface area, the tube or hollow cylinder and its attached support element become free to pivot and rotate to a new angular position around the cylindrical shaft.

Alternatively, the same effect can be achieved if the tube or hollow cylinder that is attached to the support element is constricted from moving in a lateral direction, and the rotationally stationary cylindrical shaft that is attached to a fixed surface is thrust in a lateral direction that would result in either the engagement or the total disengagement of the matching multifaceted or toothed locking areas that are located on the inner surface of the tube or hollow cylinder and the outer surface of the cylindrical shaft that is attached to a fixed surface area.

An advantage of a multi-locking rotation lock mechanism is that a small lateral displacement of the shaft, or an associated release mechanism, can result in a much longer and larger overall interlocking surface area between the cylindrical shaft and the enveloping hollow cylinder. Alternatively, the same effect applies when the enveloping hollow cylinder is displaced over a stationary cylindrical shaft. This effect results in a much more robust locking mechanism than in other lateral locking hinges with a single interlocking area, where the length and the surface of the interlocking areas is directly correlated to the length of the lateral displacement of the release mechanism or the enveloping hollow cylinder; such single interlocking area load bearing rotation locking mechanisms are more susceptible to being ground or broken due to their shorter engagement areas. In fact, a multi-locking rotation lock mechanism may represent an ideal solution for a load bearing hinge that can support the load and the pressure of a human hand pressing a stylus against the display surface of a tablet at multiple viewing and writing angles.

While the rotation lock mechanism for load bearing hinges disclosed herein has been embodied in designs that enhance the functionality, ergonomic, and enjoyment of laptops and tablets, it may also be of use in propping up other types of electronic display panels, such as smart phones, computer monitors, and even conventional picture frames, with possible applications in robotics; as robots are essentially a combination of mechanical parts connected primarily with hinges. Further, the rotation lock mechanism described herein is not limited to these applications and may be used for other applications.

BRIEF DESCRIPTION OF THE DRAWINGS

These and other features and advantages will be better and more completely understood by referring to the following description of exemplary non-limiting illustrative embodiments in conjunction with the drawings of which:

FIGS. 10A and 10B illustrate a three-dimensional perspective view of how a locking cylindrical shaft that incorporates a series of multifaceted locking areas can interlock with a matching multifaceted region or segment of the inner surface of a hollow cylinder or socket in order to fix the angular position of the shaft.

DETAILED DESCRIPTION

Disclosed herein are embodiments of a load bearing rotation lock mechanism including a cylindrical shaft and a snugly enveloping tube or hollow cylinder where the enveloping tube or hollow cylinder is attached to a pivoting support element and the cylindrical shaft is attached to a fixed surface area, and where the surface of the cavity (the inner surface) of the tube or hollow cylinder that is attached to the pivoting element incorporates at least one multisided or toothed locking area that is configured to radially mesh and interlock with a matching multifaceted or toothed locking region on the cylindrical shaft around which it rotates and wherein the locking region on the shaft engages the locking area of the tube, the pivoting support element that is attached to the tube is restricted from pivoting, and wherein the locking region on the shaft becomes disengaged from the locking area of the tube or hollow cylinder either by sliding the tube or hollow cylinder laterally over a stationary shaft, or by thrusting a rotationally stationary shaft through a laterally stationary tube or hollow cylinder, the pivoting support element that is attached to the tube or hollow cylinder becomes free to pivot and rotate around the cylindrical shaft.

The following figures illustrate the mechanics of an example non-limiting referenced multi-locking load bearing rotation lock mechanism and demonstrate exemplary embodiments of the mechanism in action. The displayed embodiments are shown for exemplary purposes; the various parts shown in the provided illustrations, such as locking areas, multifaceted locking regions, shafts, hinges, openings, springs, buttons, and plates can have various shapes and sizes to fit the desired form and function of the devise in which they are integrated.

Figure 1A:
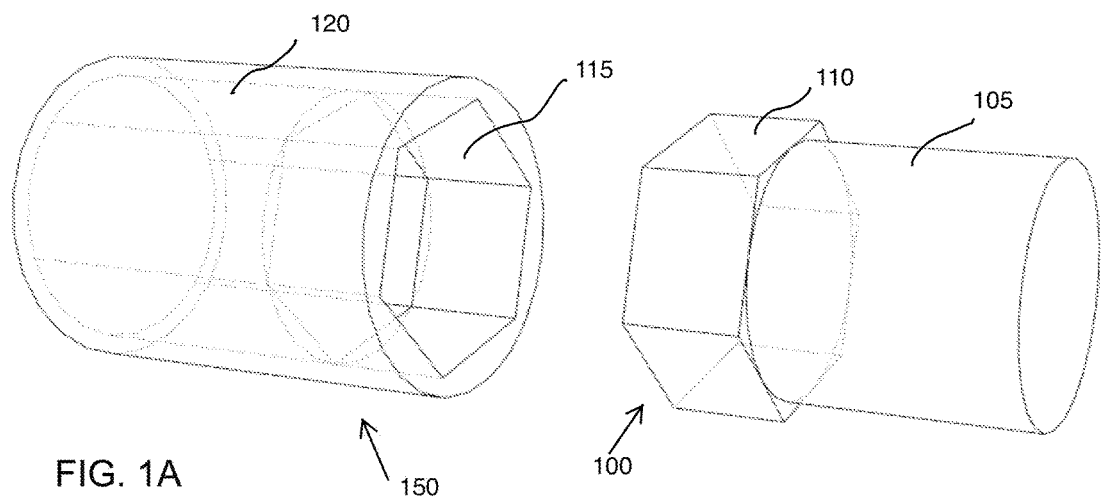
FIGS. 1A and 1B illustrate three-dimensional perspective view representations of how a multifaceted region or segment of a shaft or cylinder can interlock with a matching multi-faceted region or segment of an inner surface of a hollow cylinder or tube.

FIG. 1A represents a front perspective view of an embodiment of a locking shaft 100 with an exemplary smooth cylindrical region 105 connected to a multifaceted locking region or segment 110 just before being inserted into cylindrical chamber 150 housing a matching multifaceted locking region or segment 115 and an exemplary smooth cylindrical cavity 120. Matching multifaceted locking region or segment 115 comprises edges formed within cylindrical chamber 150 into which multifaceted locking region or segment 110 can be selectively inserted. When the multifaceted locking region or segment 110 is inserted into chamber 150, the edges of the multifaceted locking region or segment 110 mesh and interlock with the edges of the matching multifaceted locking region or segment 115 within cylindrical chamber 150 and locking shaft 100 is prevented from pivoting. Cylindrical cavity 120, on the other hand, is round, smooth, and tubular so that when multifaceted locking region or segment 110 of locking shaft 100 is further thrust into cylindrical cavity 120 of cylindrical chamber 150, locking shaft 100 and any element that may be fastened to the shaft are allowed to pivot freely around the axis of cylindrical chamber 150. A user can rotate locking shaft 100 (or a structure attached to the locking shaft) to any desired angle or orientation. When the user has rotated the locking shaft 100 to a desired position, the user may then thrust multifaceted locking region or segment 110 into the matching multifaceted locking region or segment 115, thereby rotationally locking multifaceted locking region or segment 110 (and thus fixing the angular rotation of locking shaft 100, and any structure attached to it) relative to cylindrical chamber 150, and when the user further thrusts locking shaft 100 into cylindrical chamber 150 where multifaceted locking region or segment 110 is now positioned in cylindrical cavity 120, locking shaft 100 and any element that may be fastened to the locking shaft 100 are allowed to pivot freely around the axis of cylindrical chamber 150.

Figure 1B:
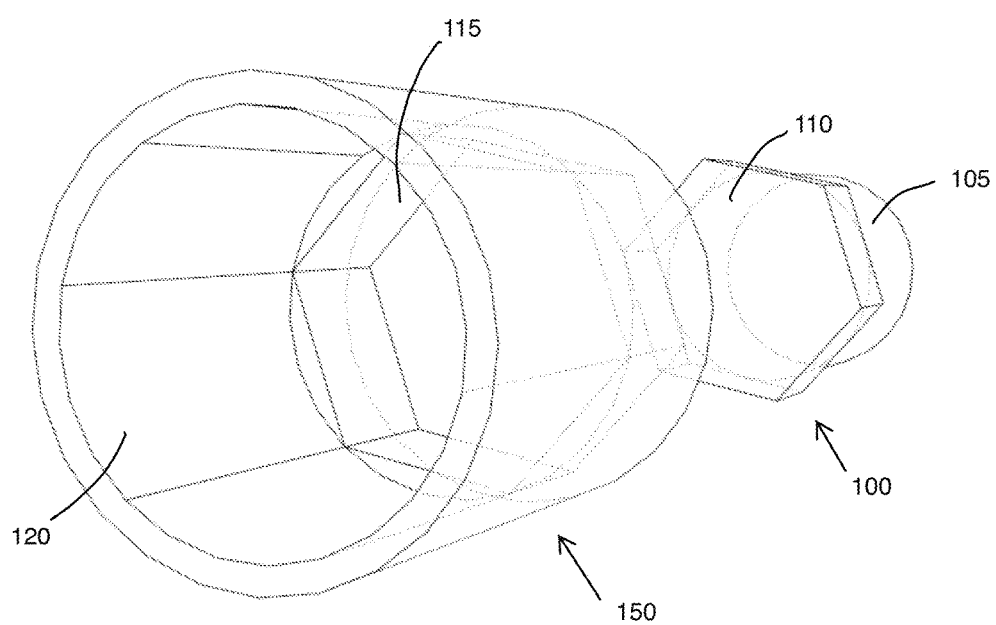

FIG. 1B represents a back perspective view of an embodiment of a locking shaft 100 with an exemplary smooth cylindrical region 105 connected to a multifaceted locking region or segment 110 just before being inserted into cylindrical chamber 150 housing a matching multifaceted locking region or segment 115 and an exemplary smooth cylindrical cavity 120.

Figure 1C:
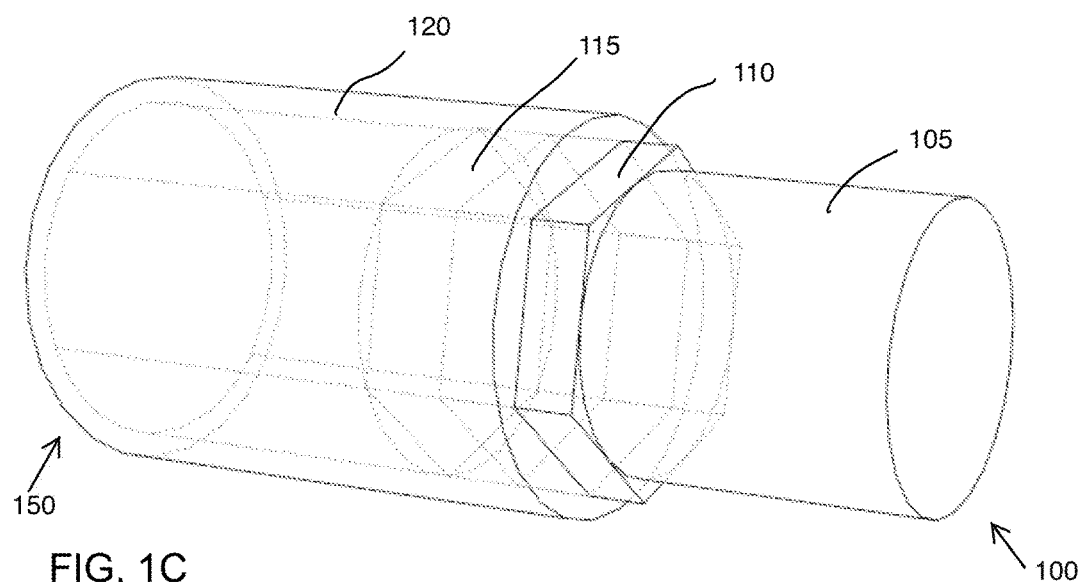
FIG. 1C illustrates a three-dimensional perspective view of how a multifaceted region or segment of a shaft or cylinder interlocks with a matching multi-faceted region or segment of an inner surface of a hollow cylinder or tube fixing the angular rotation of the shaft or cylinder with respect to the hollow cylinder or tube.

FIG. 1C illustrates a three-dimensional perspective view of how the multifaceted region or segment 110 of locking shaft 100 interlocks with the matching multifaceted locking region or segment 115 of cylindrical chamber 150 fixing the angular rotation of locking shaft 100 with respect to cylindrical chamber 150.

Figure 1D:
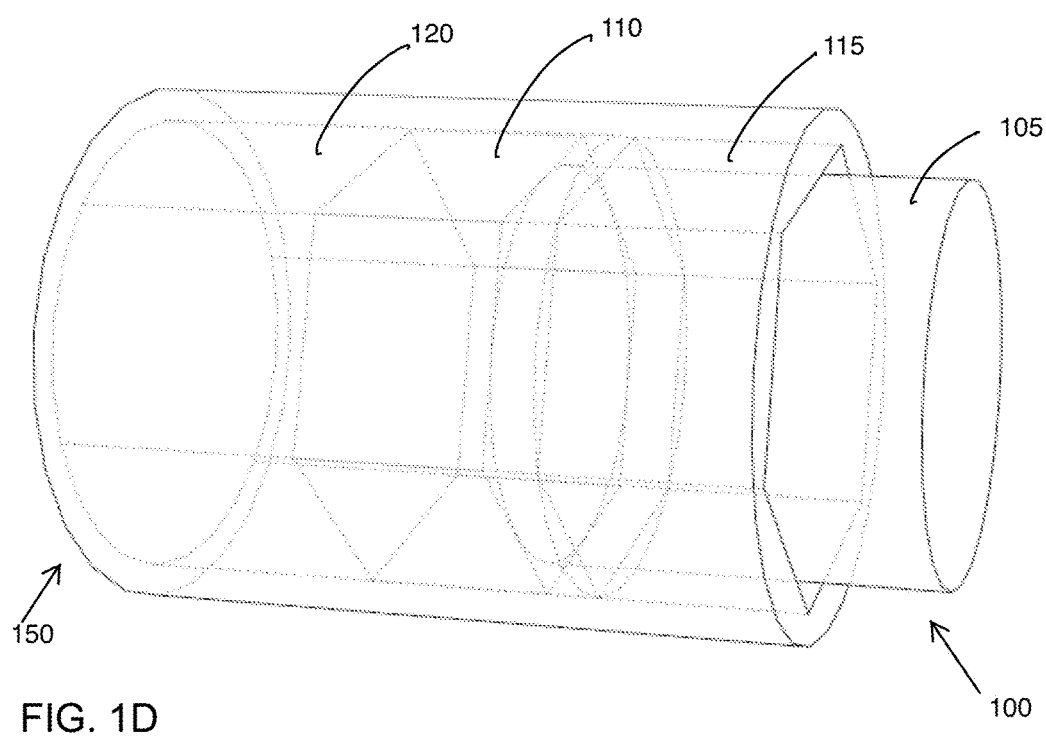
FIG. 1D illustrates a three-dimensional perspective view of how a multifaceted region or segment of a shaft or cylinder can, when pushed further inward, disengage internally from a matching multi-faceted region or segment on an inner surface of a hollow cylinder or tube allowing the shaft or cylinder to pivot with respect to the hollow cylinder or tube.

FIG. 1D illustrates a three-dimensional perspective view of how multifaceted locking region or segment 110 of locking shaft 100 can, when pushed further inward into cylindrical cavity 120 of cylindrical chamber 150, disengage completely from the matching multifaceted locking region or segment 115 of cylindrical chamber 150 freeing locking shaft 100 to pivot with respect to cylindrical chamber 150.

Figure 2A:
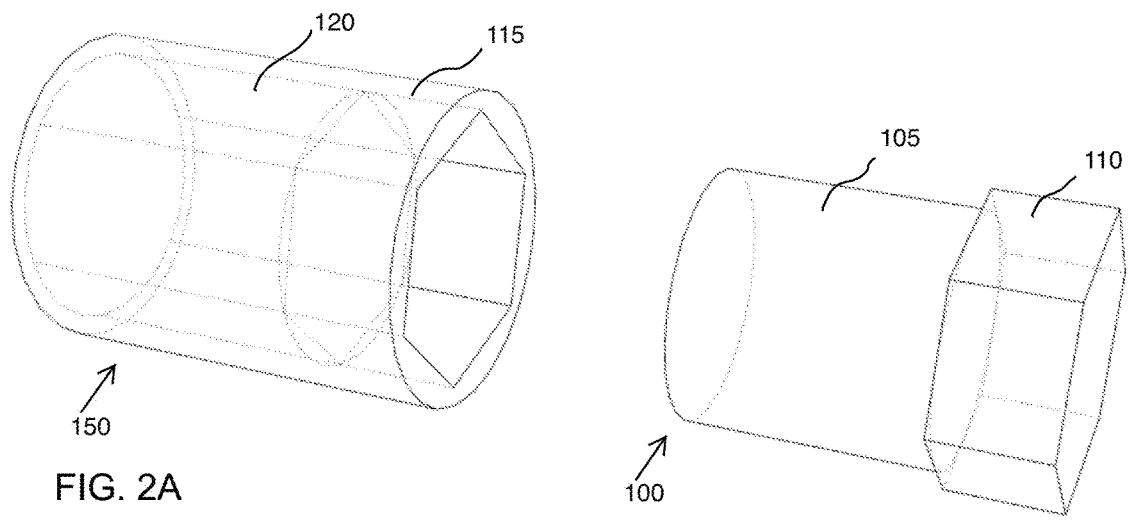
FIGS. 2A and 2B illustrate a three-dimensional perspective view of how a smooth cylindrical region or segment of a shaft or cylinder can interface with a matching multi-faceted region or segment on an inner surface of a hollow cylinder or tube.

FIG. 2A represents a front perspective view of the smooth cylindrical region 105 of locking shaft 100 just before being inserted into the multifaceted locking region or segment 115 of cylindrical cavity 150.

Figure 2B:
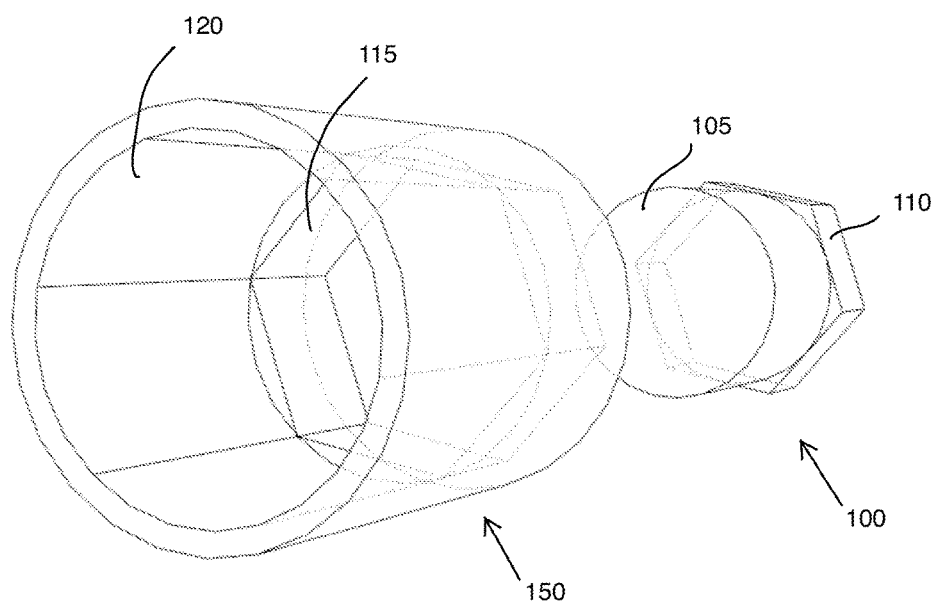

FIG. 2B represents a back perspective view of the smooth cylindrical region 105 of locking shaft 100 just before being inserted into multifaceted locking region or segment 115 of cylindrical cavity 150.

Figure 2C:
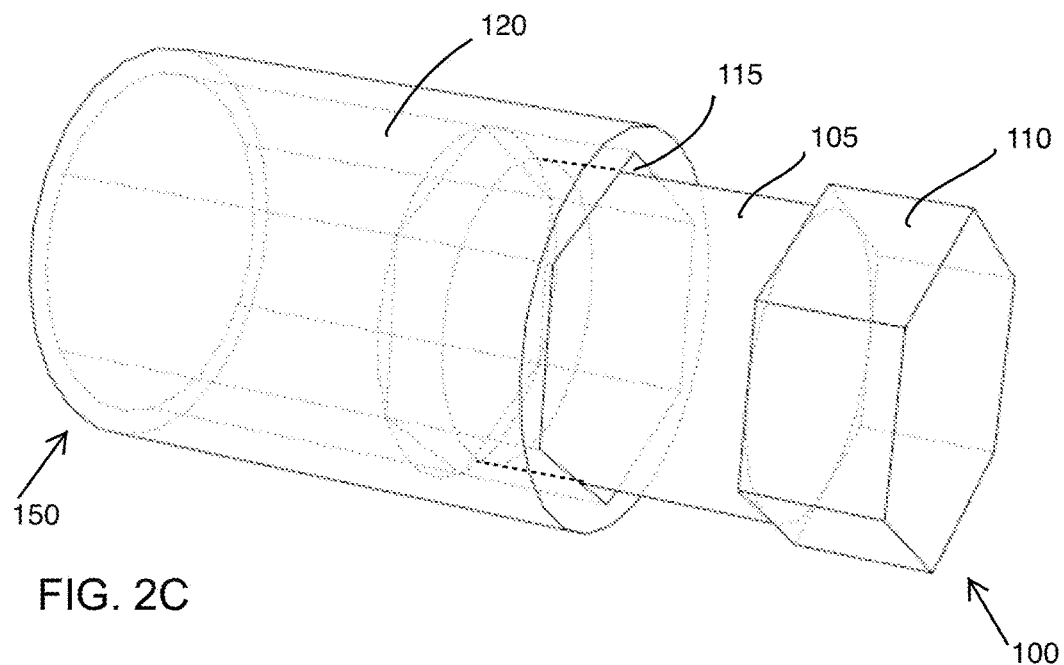
FIG. 2C illustrates a three-dimensional perspective view of how a smooth cylindrical region or segment of a shaft can interface with a corresponding multi-faceted region or segment of an inner surface of a hollow cylinder or tube and still allow the shaft or cylinder unrestrained angular rotation with respect to the hollow cylinder or tube.

FIG. 2C illustrates a three-dimensional perspective view of how when smooth cylindrical region 105 of locking shaft 100 engages with multifaceted locking region or segment 115 of cylindrical chamber 150, locking shaft 100 is not restricted from pivoting with respect to cylindrical chamber 150.

Figure 2D:
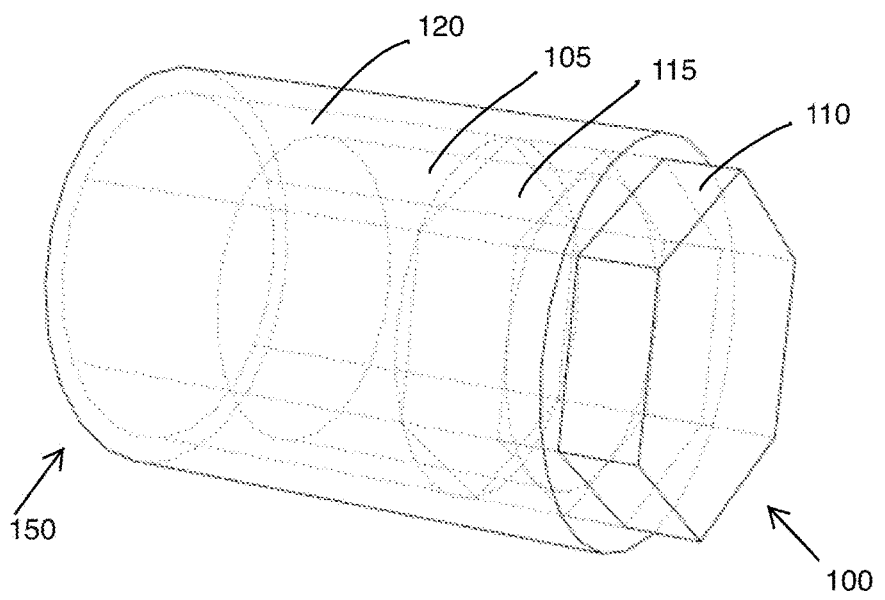
FIG. 2D illustrates a three-dimensional perspective view of how a multifaceted region or segment of a shaft or cylinder, when pushed further inward inside the hollow cylinder or tube of FIG. 2D, can engage the matching multi-faceted region or segment of the inner surface of the hollow cylinder or tube and restrain the shaft or cylinder from further pivoting inside the hollow cylinder or tube.

FIG. 2D illustrates a three-dimensional perspective view of how when locking shaft 100 is pushed further inward into cylindrical chamber 150, multifaceted locking region or segment 110 of locking shaft 100 comes in contact with the matching multifaceted locking region or segment 115 of cylindrical chamber 150 preventing locking shaft 100 from pivoting with respect to cylindrical chamber 150.

Figure 3A:
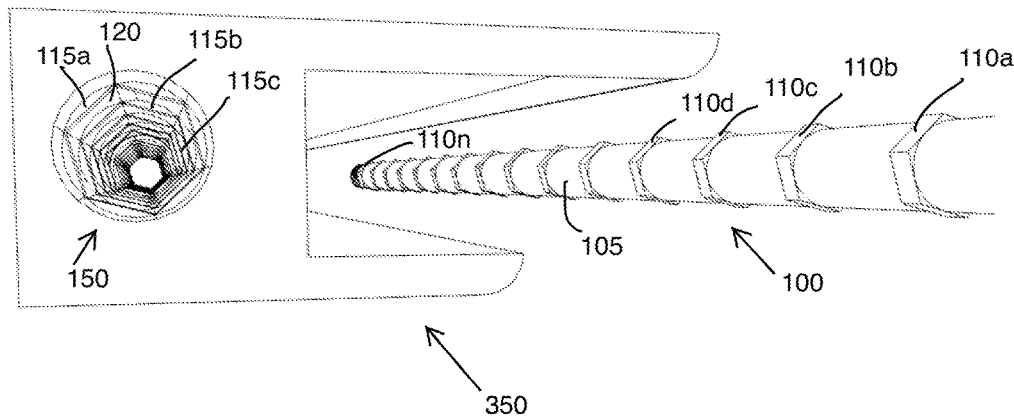
FIG. 3A illustrates a three-dimensional perspective view of how a plurality or series of multifaceted regions or segments on a shaft or cylinder can interlock with a plurality or series of matching multi-faceted regions or segments on an inner surface of a hollow cylinder or tube.

FIG. 3A illustrates a three-dimensional perspective view of an embodiment of an exemplary releasable locking assembly including a locking shaft 100 with a smooth cylindrical region 105 having a first locking region consisting of a plurality, or series, of multifaceted locking regions or segments (110a)-(110n) on an outer circumference of the shaft, and a hollow cylinder or tube 150 that can receive the locking shaft 100, wherein the hollow cylinder or tube 150 includes a second locking region with a plurality, or a series of two or more matching multifaceted locking regions or segments (115a)-(115n) on an inner wall 120 of the cylinder, wherein the first locking region and the second locking region are configured to slidably engage; and wherein the locking regions slidably engage, they lock the angular position of the locking hinge, and where they slidably disengage, they allow the locking hinge to pivot.

Figure 3B:
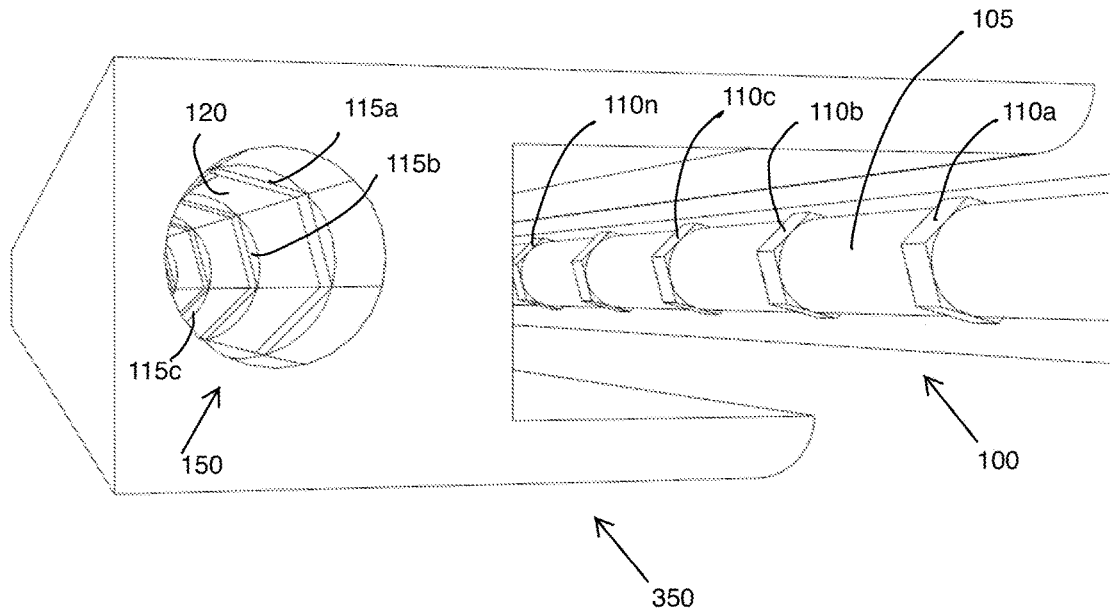
FIG. 3B illustrates a close-up of a three-dimensional perspective view of how a plurality or series of multifaceted regions or segments on a shaft or cylinder can interlock with a plurality or series of matching multi-faceted regions or segments of an inner surface of a hollow cylinder or tube.

FIG. 3B illustrates a close-up view of the three-dimensional perspective view of the embodiment of the exemplary releasable locking assembly shown in FIG. 3A above.

Figure 4A:
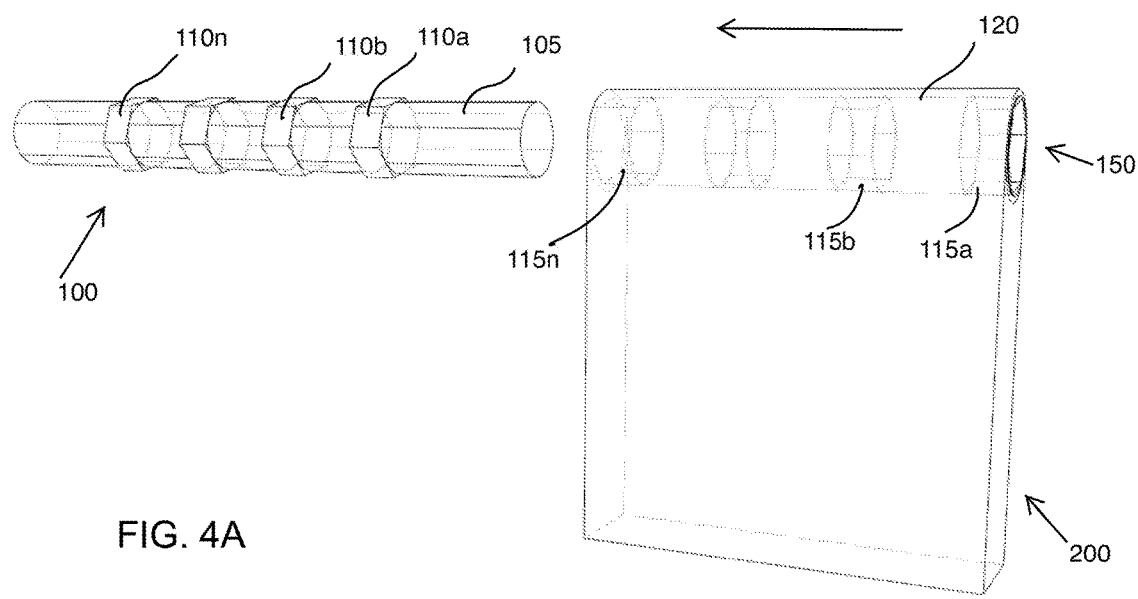
FIGS. 4A to 4C show an example flip chart animation of how the rotational position of a pivoting support element attached to a tube or hollow cylinder that incorporates a series of multifaceted locking regions or segments on an inner surface of the hollow cylinder or tube can be locked, unlocked, and rotated, when thrust and retracted from a cylindrical shaft with a matching series of multifaceted locking regions or segments on the outer surface area of the shaft.
Figure 4B:
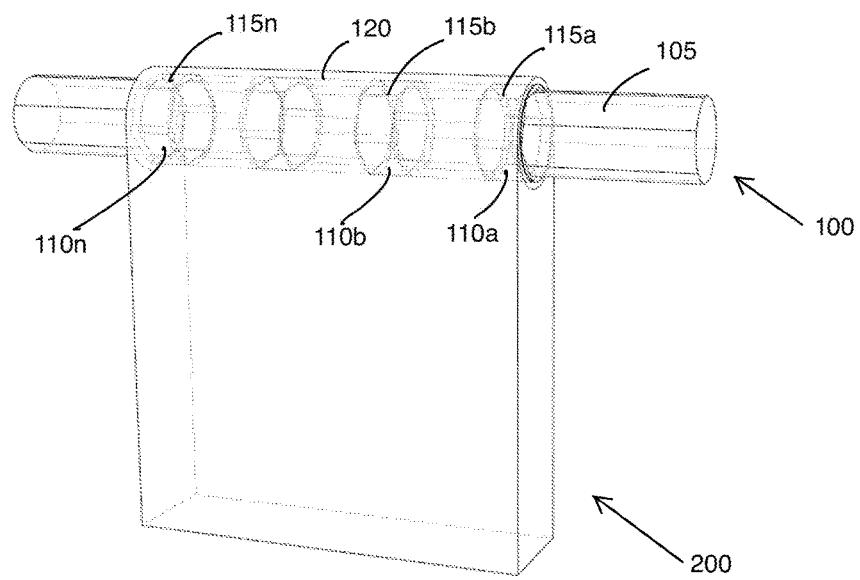
Figure 4C:
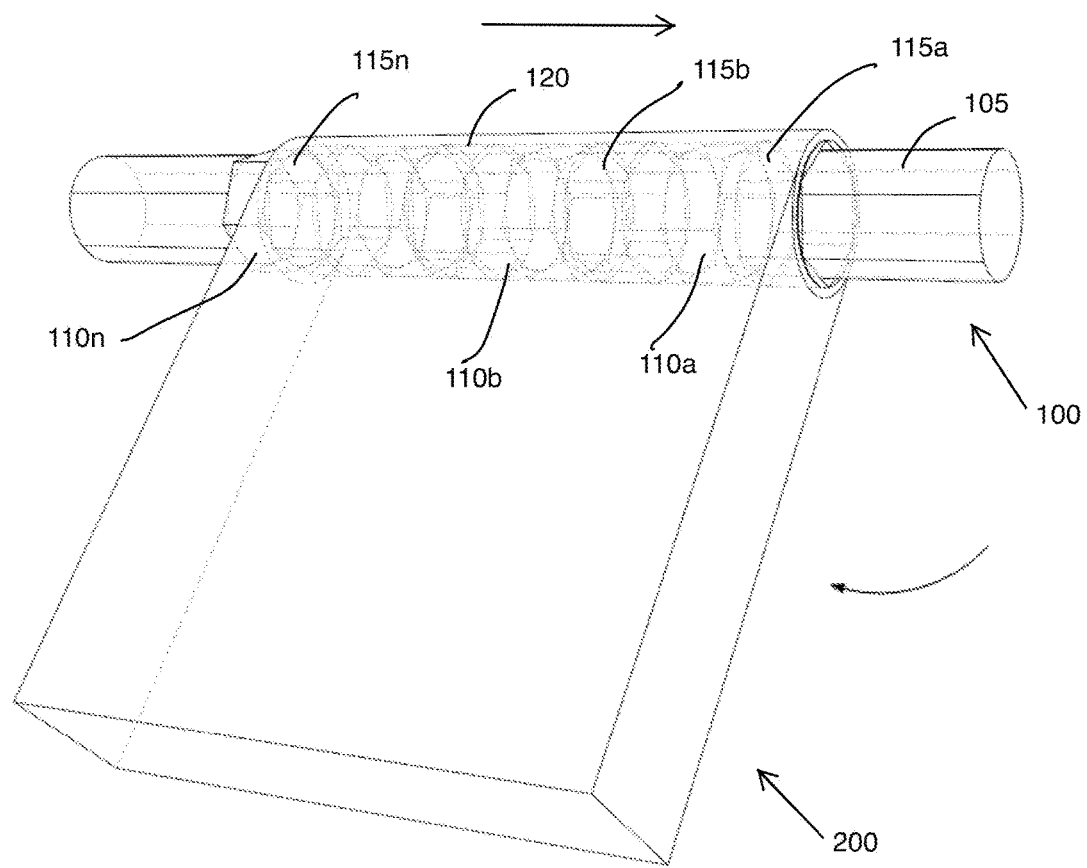

FIGS. 4A to 4C show an example flip chart animation of how the rotational position of a pivoting support element 200 attached to a tube or hollow cylinder 150 that incorporates a series of multifaceted locking regions or segments (115a)-(115n) on a smooth inner surface 120 of the hollow cylinder or tube 150 can be locked, unlocked, and rotated when thrust and retracted from a locking cylindrical shaft 100 with a matching series of multifaceted locking regions or segments (110a)-(110n) on the smooth outer surface 105 of the locking shaft 100.

Figure 5A:
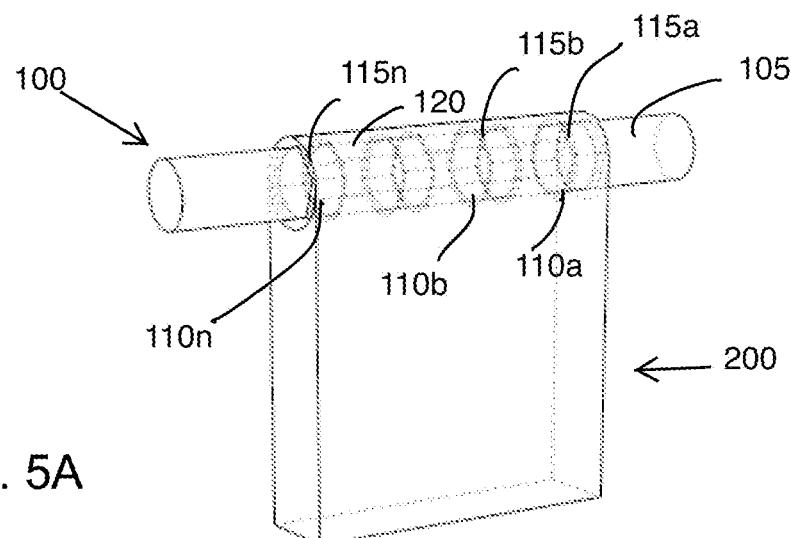
FIG. 5A illustrates a three dimensional perspective view of how when a series of multifaceted locking regions or segments of a tube or hollow cylinder that is attached to a pivoting element come in contact with a matching series of multifaceted locking regions or segments on the outer surface of a locking shaft, the meshing areas interlock and the tube or hollow cylinder and the pivoting element to which it is attached can no longer pivot around the locking shaft.

FIG. 5A illustrates a three dimensional perspective view of how when a series of multifaceted locking regions or segments (115a)-(115n) of a tube or hollow cylinder 150 that is attached to a pivoting element 200 come in contact with a matching series of multifaceted locking regions or segments (110a)-(110n) on the outer surface 105 of a locking shaft 100, the meshing regions or segments interlock and the tube or hollow cylinder 150 and the pivoting element 200 to which it is attached can no longer pivot around the locking shaft 100.

Figure 5B:
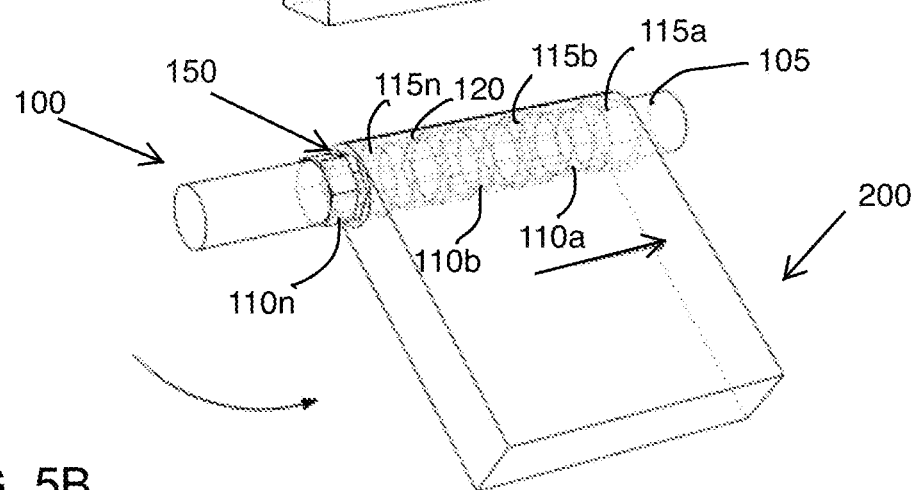
FIG. 5B illustrates how when the series of multifaceted locking regions or segments of the tube or hollow cylinder that is attached to a pivoting element is thrust in a direction that results in the complete disengagement of the radially locking multifaceted regions or segments that are on the inner surface of the tube or hollow cylinder and a series of matching multifaceted locking regions or segments that are located on the locking shaft, the tube or hollow cylinder and its attached support element become free to pivot and rotate to a new angular position around the locking shaft.

FIG. 5B illustrates how when the series of multifaceted locking regions or segments (115a)-(115n) of the tube or hollow cylinder 150 that is attached to a pivoting element 200 is thrust in a direction that results in the complete disengagement of the radially locking multifaceted regions (115a)-(115n) that are on the inner surface of the tube or hollow cylinder 150 and the series of matching multifaceted locking regions (110a)-(110n) that are located on the surface 105 of locking shaft 100, the tube or hollow cylinder 150 and its attached support element 200 become free to pivot and rotate to a new angular position around the locking shaft.

Figure 5C:
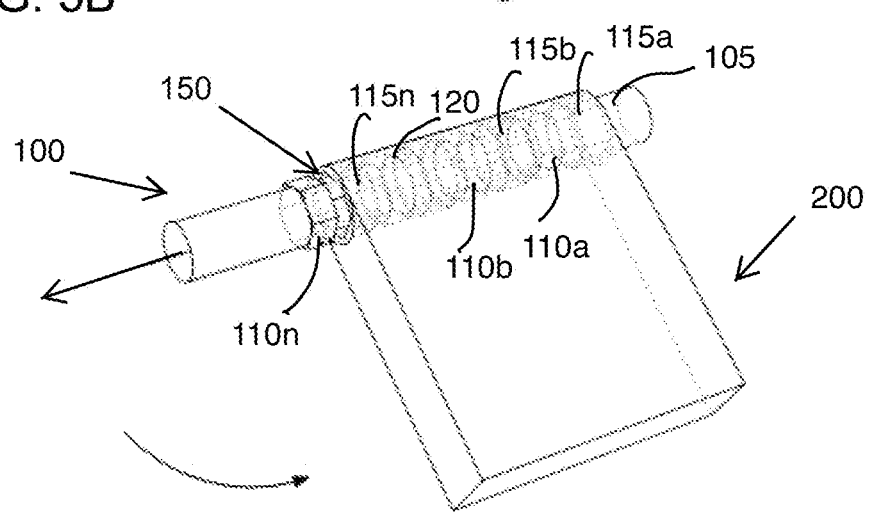
FIG. 5C illustrates how constricting the tube or hollow cylinder that is attached to the support element from moving in a lateral direction, and thrusting the locking shaft in a lateral direction that would result in the total disengagement of the series of matching multifaceted regions or segments that are located on the inner surface of the tube or hollow cylinder and the outer surface of the locking shaft would also free the tube or hollow cylinder and its attached support element to pivot and rotate to a new angular position around the locking shaft.

FIG. 5C illustrates how constricting the tube or hollow cylinder 150 that is attached to the support element 200 from moving in a lateral direction, and thrusting the locking shaft 100 in a lateral direction that would result in the total disengagement of the series of matching multifaceted regions (115a)-(115n) that are located on the inner surface of the tube or hollow cylinder and the outer surface of the locking shaft (110a)-(110n) would also free the tube or hollow cylinder and its attached support element to pivot and rotate to a new angular position around the locking shaft.

FIGS. 6A to 6E show an example flip chart animation of how the rotational position of a pivoting support element 200 attached to a tube or hollow cylinder 150 that incorporates a series of multifaceted locking regions (115a)-(115n) in the cavity of the tube or hollow cylinder can be locked, unlocked, rotated, and relocked when thrust and retracted from a matching series of multifaceted regions (110a)-(110n) on the outer surface area 105 of a matching locking shaft 100.

Figure 6A:
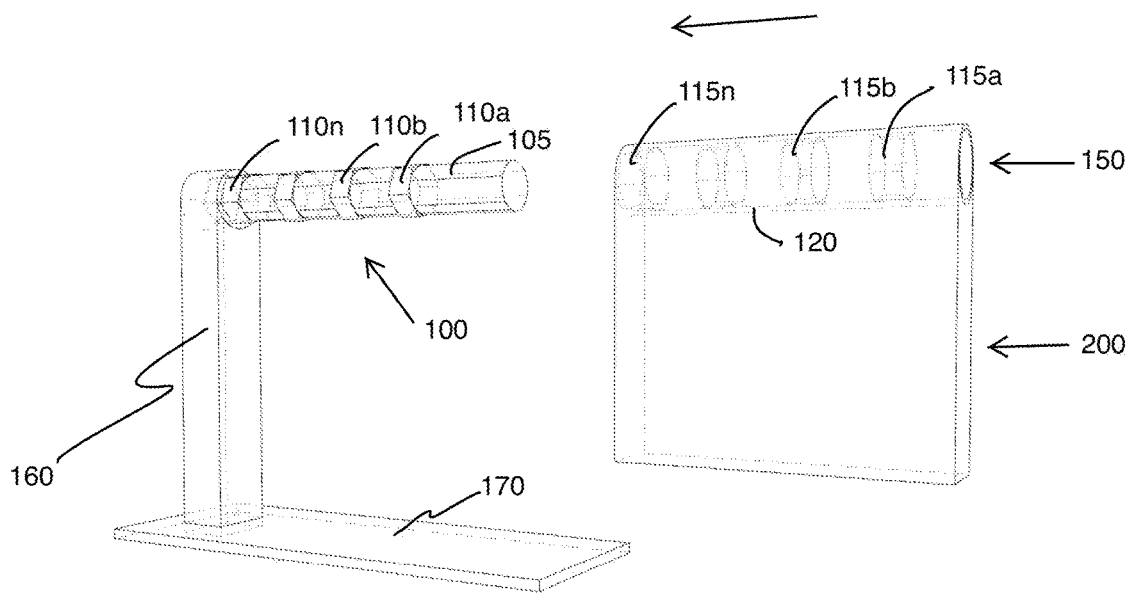
FIGS. 6A to 6E show an example flip chart animation of how the rotational position of a pivoting element attached to a tube or hollow cylinder that incorporates a series of multifaceted locking areas in the cavity of the tube or hollow cylinder can be locked, unlocked, rotated, and relocked when thrust and retracted from a matching series of multifaceted regions on the outer surface area of a matching locking cylindrical shaft.

FIG. 6A illustrates the initial, disengaged, position of the support element 200 that may be attached to a device including a tube or hollow cylinder 150 before it becomes engaged to the locking shaft 100. The support element 200 may be a plate, leg, or other device that provides support for a device 160 in need of support. The device 160 may be a tablet computer, a smart phone, electronic book, or other device that may stand on its lower edge 170. The device 160 may be unstable when on its edge 170, especially if the device is positioned at an angle to provide better view of the device. The support element 200 provides a leg attachable to the device 160 that can be positioned to have a lower end seated on the same surface that supports the lower edge 170 of the device.

As shown in FIG. 6A, the support element 200 is disengaged from the device 160 and particularly from the locking shaft 100 of the device. In this configuration, the support element does not support the device 160 and may be housed in a recess in the back of the device or separated from the device. It should be noted that the support element 200 is free to pivot or otherwise move with respect to the device 160 while in the arrangement shown in FIG. 6A.

Figure 6B:
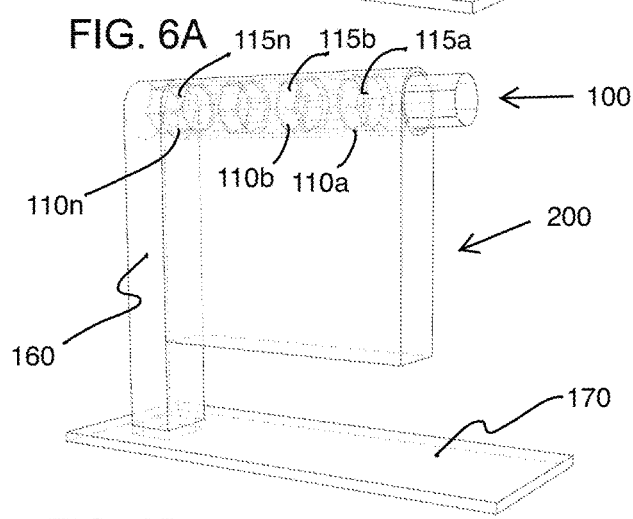

FIG. 6B illustrates the pivoting support element 200 attached to the tube or hollow cylinder 150 in an initial locked position. The locking is achieved because the series of multifaceted locking regions or segments (115a)-(115n) of the tube or hollow cylinder 150 that is attached to a pivoting element 200 come in contact with a matching series of multifaceted locking regions or segments (110a)-(110n) on the outer surface 105 of a locking shaft 100, the meshing regions or segments interlock and the tube or hollow cylinder 150 and the pivoting element 200 to which it is attached can no longer pivot around the locking shaft 100. In the configuration shown in FIG. 6B, the support element is radially aligned with the lower edge 170, which would occur if the support element is stowed in a cavity or recess of the device 160.

Figure 6C:
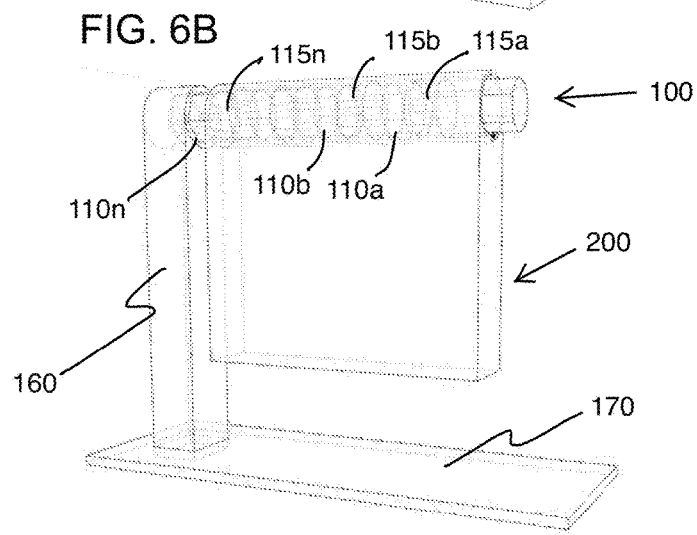

FIG. 6C illustrates the pivoting support element 200 that is attached to a tube or hollow cylinder 150 having moved to an unlocked position with its multifaceted locking regions or segments (115a)-(115n) in the cavity of the attached tube or hollow cylinder disengaged (unlocked) from the matching series of multifaceted regions or segments (110a)-(110n) on the outer surface area 105 of the matching locking shaft 100. The cylinder 150 remains on the locking shaft 100 and thus the support element 200 is constrained to pivot about the shaft and slide axially along the shaft.

Figure 6D:
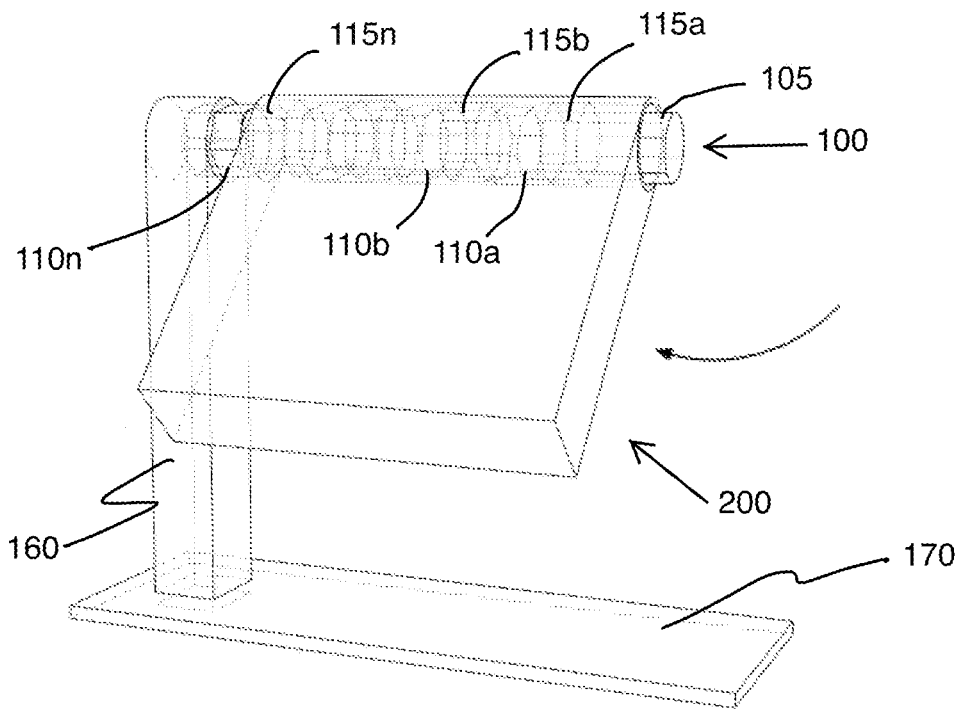

FIG. 6D illustrates the pivoting support element 200 that is attached to tube or hollow cylinder 150 having pivoted to a new angular position while its multifaceted locking regions or segments (115a)-(115n) continue to be disengaged (unlocked) from the matching series of multifaceted regions or segments (110a)-(110n) on the outer surface area 105 of locking shaft 100. For example, the support element is pivoted to a desired angular position to support the device as it sits on its edge 160.

Figure 6E:
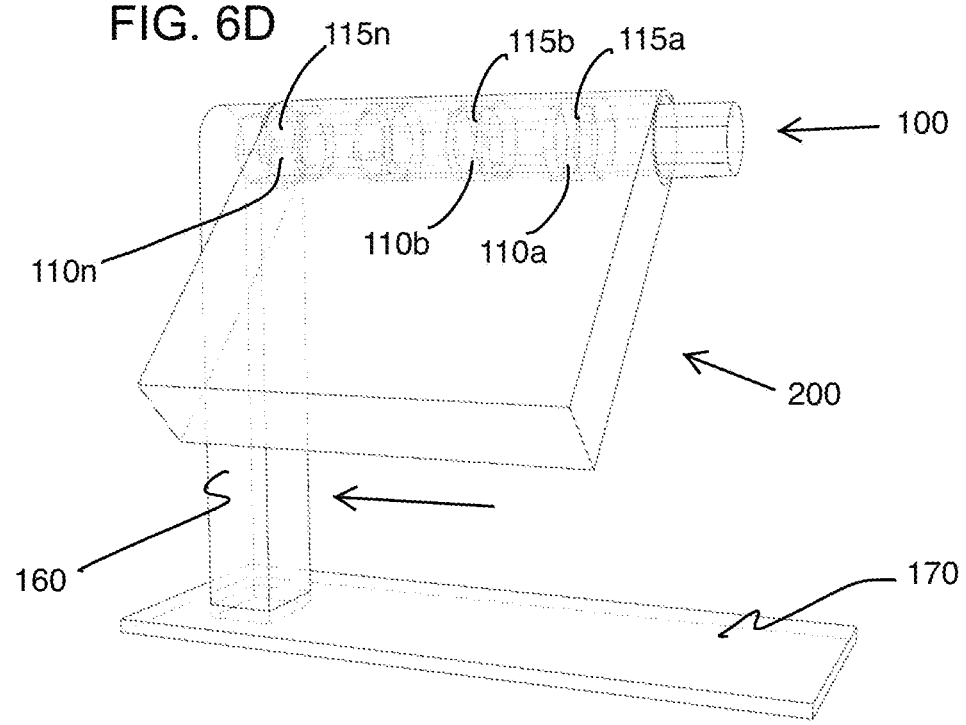
Figure 7A:
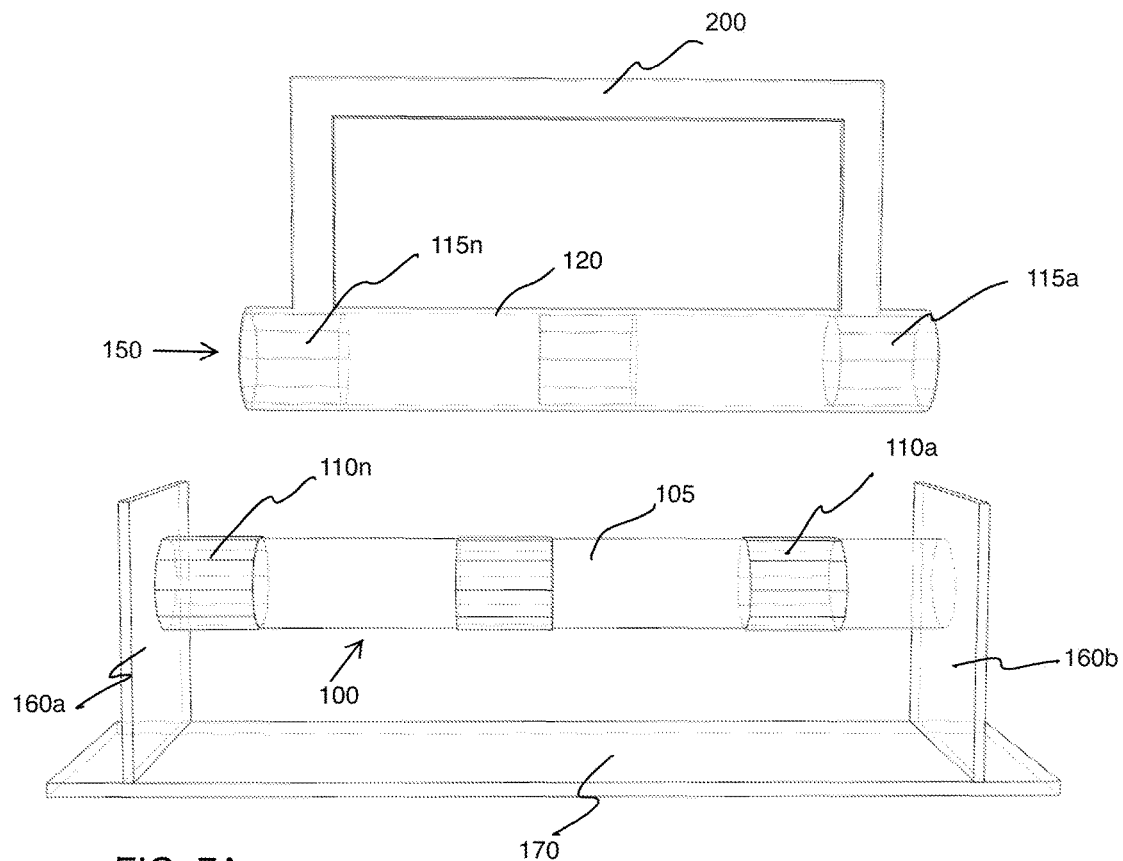
FIGS. 7A and B, 8A and B, and 9A and B illustrate an example flip chart animation of how a non-limiting pivoting element, handle, or support stand that is attached to a hollow cylinder or tube that incorporates a series of multifaceted locking areas in the cavity of the attached tube or hollow cylinder, can be rotated and locked when thrust into a matching series of multifaceted regions on the outer surface area of a matching locking cylindrical shaft.
Figure 7B:
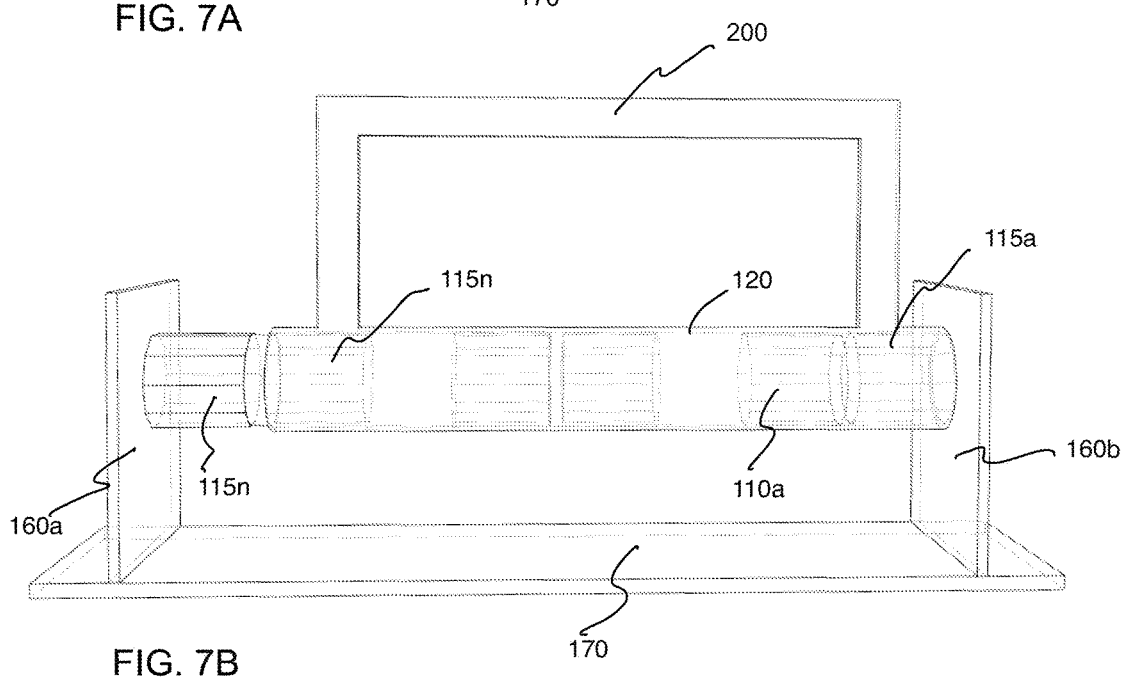
Figure 8A:
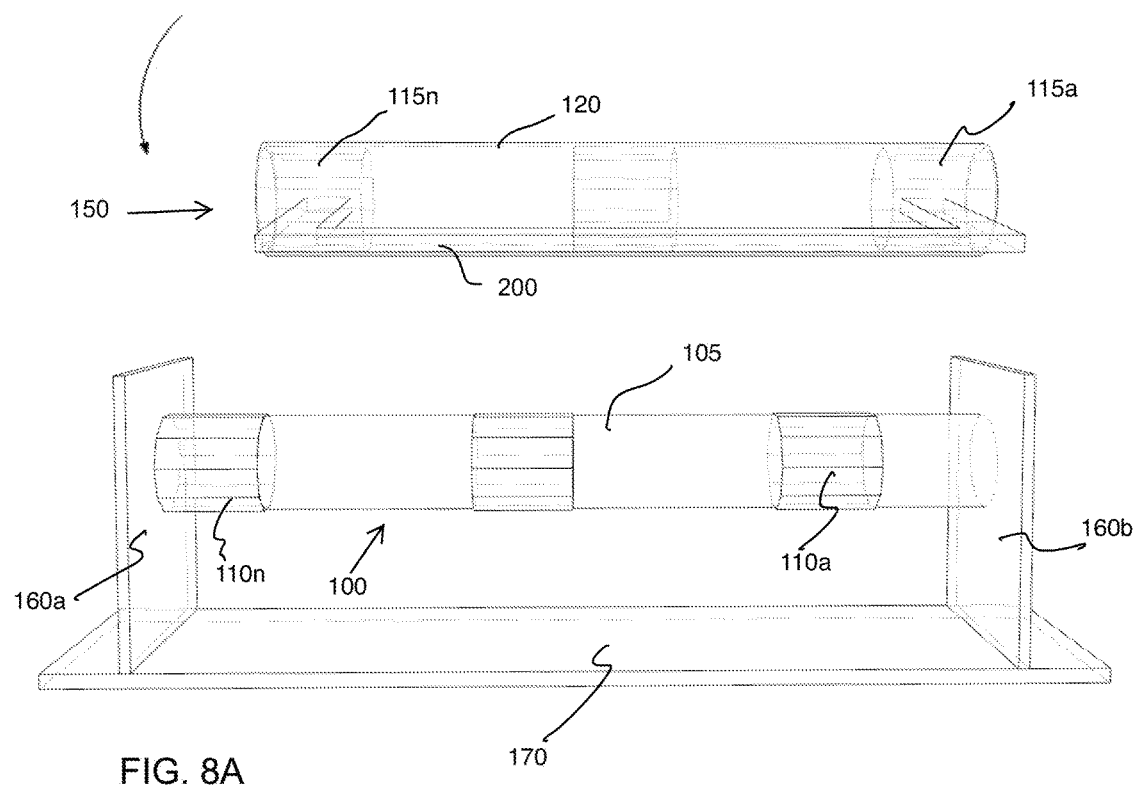
Figure 8B:
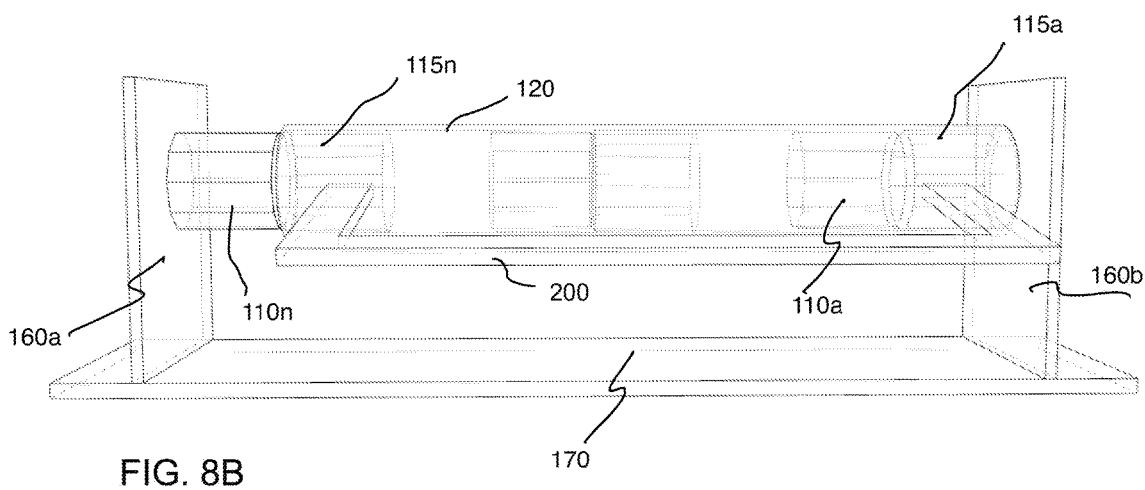
Figure 9A:
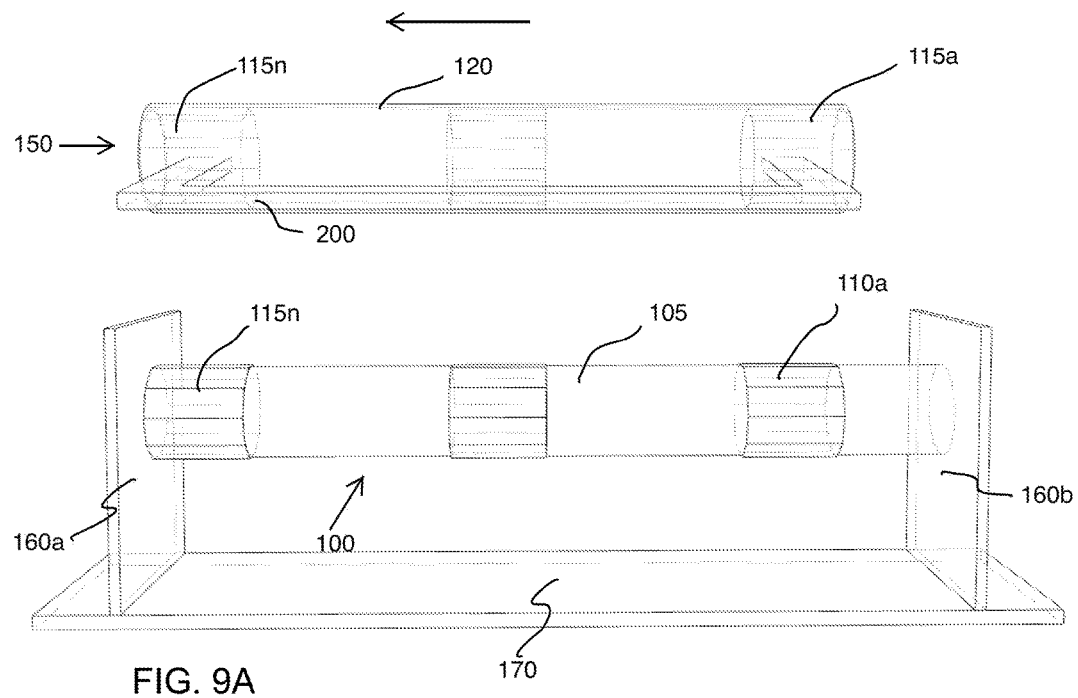
Figure 9B:
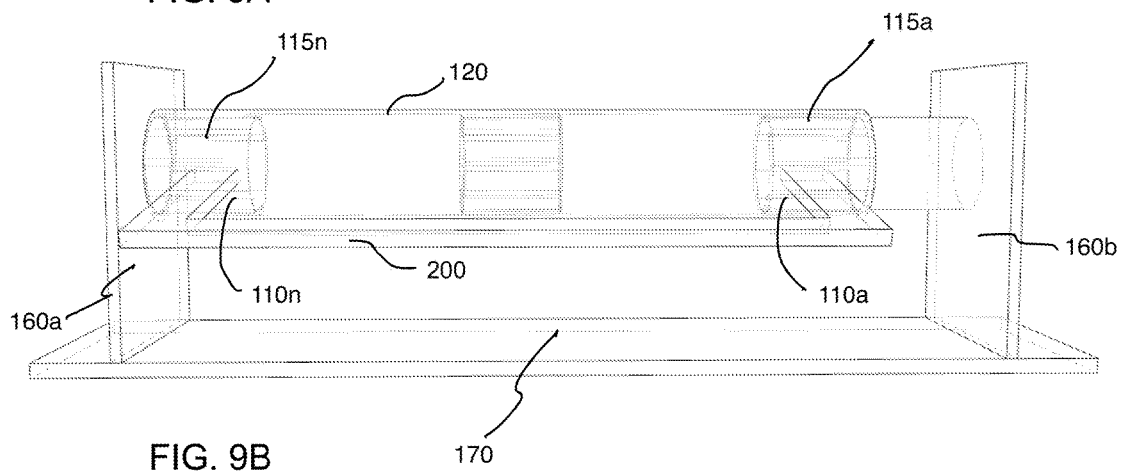

As shown in FIG. 6E, when the desired angular position is achieved, the support element 200 is slid axially along the locking shaft 100 until the multi-faceted locking regions or segments (115a)-(115n) in the cavity of the attached tube or hollow 150 engage the multifaceted locking regions or segments (110a)-(110n) on the outer surface area 105 of the matching locking shaft 100.

FIG. 6E illustrates the newly fixed angular position of the pivoting support element 200 that is attached to tube or hollow cylinder 150 after having slid back into the locked position subsequent to having pivoted to a new angular position while its multi-sided cavity 150 was fully disengaged from the multifaceted locking regions or segments (110a)-(110n) on the outer surface area 105 of matching locking shaft 100.

FIGS. 7A to 9B illustrate two independent views of yet another example flip chart animation of how a non-limiting pivoting support element such as a handle or a support stand 200 that is attached to a hollow cylinder or tube 150 that incorporates a series of multifaceted locking areas (115a)-(115n) in the cavity of the attached tube or hollow cylinder, can be rotated and locked when thrust into a matching series of multifaceted regions (110a)-(110n) on the outer surface area 105 of a matching locking shaft 100. The support element 200 may be a plate, leg, or other device that provides support for a device 160 in need of support. The device 160 may be a tablet computer, a smart phone, electronic book, or other device that may stand on its lower edge 170. The device 160 may be unstable when on its edge 170, especially if the device is positioned at an angle to provide better view of the device. The support element 200 provides a leg or a handle attachable to the device 160 that can be positioned to have a lower end seated on the same surface that supports the lower edge 170 of the device.

FIG. 10A illustrates a perspective view of an embodiment of a locking shaft 100 with a series of multifaceted locking regions or segments (110a)-(110n) on the outer surface 105 of the locking shaft just before being inserted into cylindrical socket 125b housing a matching multifaceted locking region or segment 130b.

FIG. 10B illustrates a three-dimensional perspective view of how one of the multifaceted regions or segments (110a)-(110n) at one end of locking shaft 100 can interlock with a matching multifaceted locking region or segment 130b of cylindrical socket 125b to fix the angular rotation of locking shaft 100 with respect to the socket. The socket may be attached to a fixed structure or to the back panel of an electronic device, thereby fixing the angular rotation of the locking shaft 100 with respect to the fixed structure or to the back of the electronic device.

FIGS. 11A to 11E show a sequence of drawings that illustrate how a locking shaft 100 with a series of multifaceted regions or segments (110a)-(110n) may be rotationally restrained and secured to a fixed surface, such as the back of a computer tablet or a display monitor, using two sockets 125a and 125b with locking areas 130a and 130b that can interlock with matching multifaceted regions on either ends of the shaft (110a) and (110n); and how a hollow cylinder or tube 150 with a matching series of multifaceted locking regions or segments on the inner surface of the hollow cylinder or tube (115a)-(115n) can be made to pivot or to lock with the respect to the locking shaft 100 depending on the cylinder or tube's lateral position on the locking shaft.

Figure 11A:
FIGS. 11A to 11E illustrate a three-dimensional perspective view of how a locking cylindrical shaft with a series of multifaceted regions or segments may be made rotationally stationary using two sockets with locking areas that can interlock with matching multifaceted regions on either ends of the shaft, and how a hollow cylinder or tube with a matching series of multifaceted regions on the inner surface of the tube can be made to rotate or to lock depending on the cylinder's lateral position on the shaft.

FIG. 11A shows two sockets 125a and 125b with locking areas 130a and 130b that can interlock with matching multifaceted regions on either ends of a locking shaft 100. The sockets may be imbedded at either end of a slot on the back surface of a computer tablet, a display panel, or other similar type of device.

Figure 11B:
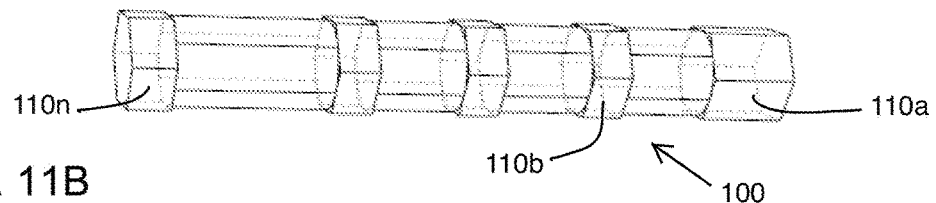

FIG. 11B illustrates a locking shaft 100 with a series of multifaceted regions or segments (110a)-(110n).

Figure 11C:
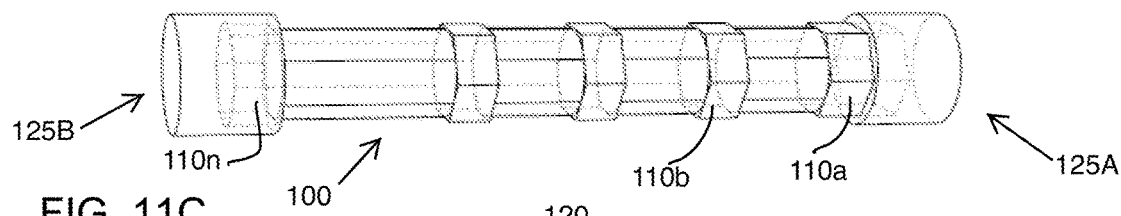

FIG. 11C illustrates how the locking shaft 100 of FIG. 11B can interlock with the sockets 125A and 125B of FIG. 11A.

Figure 11D:
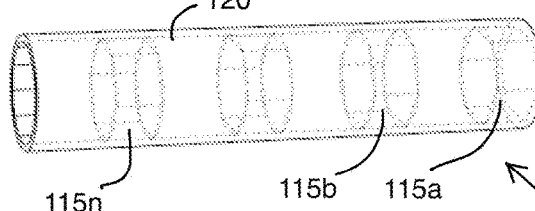

FIG. 11D illustrates how a hollow cylinder or tube 150 with multifaceted regions or segments (115a)-(115n) on an inner surface of the hollow cylinder or tube can be made to align and engage the rotationally fixed shaft's matching multifaceted regions or segments (110a)-(110n) in order to fix the rotational position of the hollow cylinder or tube 150.

Figure 11E:
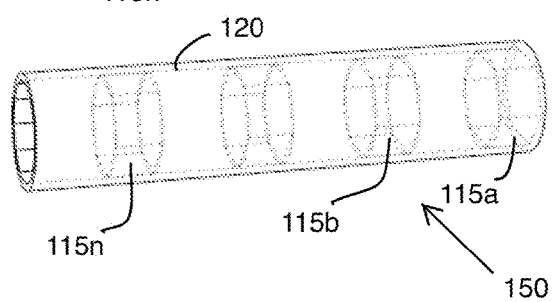

FIG. 11E illustrates how a hollow cylinder or tube 150 with multifaceted regions or segments (115a)-(115n) on an inner surface of the hollow cylinder or tube can be made to realign, by sliding to the left, in order to disengage from the rotationally fixed shaft's matching multifaceted regions or segments (110a)-(110n) in order to free the hollow cylinder or tube 150 to pivot around the rotationally fixed shaft 100.

Figure 12A:
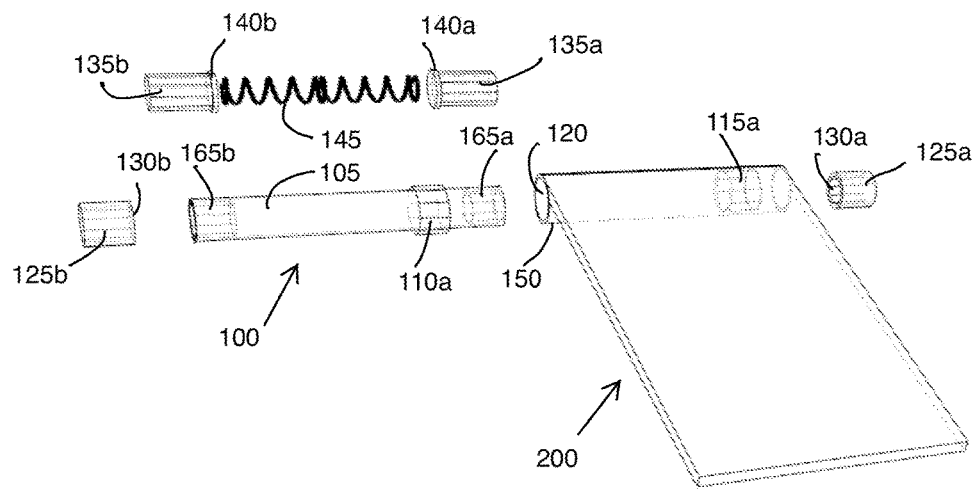
FIG. 12A illustrate a three-dimensional perspective exploded view of a non-limiting embodiment of the components of a compact bi-positional internal locking load bearing rotation lock mechanism. The embodiment consists of a pivoting element connected to a hollow cylinder with at least one multifaceted locking area that is configured to radially mesh and interlock with a matching multifaceted locking region on a cylindrical shaft around which it can be made to lock, unlock, rotate, and relock by sliding and rotating the pivoting element over the shaft. Also shown are two multifaceted and ledged retractable fasteners and a spring that can be positioned inside the shaft. The mechanism works by sliding the tube that is attached to the pivoting element over the shaft. The shaft can then be attached to a surface or an object by compressing the multifaceted ledged retractable fasteners and releasing them once the shaft is aligned with ribbed sockets with multifaceted areas that match the multifaceted surface of the ledged retractable fasteners.

FIG. 12A illustrates a practical application of the method of FIGS. 11A-11E. FIG. 12A shows how a pivoting element 200 can be made to lock, unlock, rotate and relock by sliding the pivoting element 200 over a locking shaft 100. In this non-limiting example, pivoting element 200 is traversed by a hollow cylinder or tube 150 with a single multifaceted region or segment 115a on an inner surface of the hollow cylinder. Hollow cylinder or tube 150 can slide over locking shaft 100 which has a single matching multifaceted locking region or segment 110a. When multifaceted region or segment 115a on the inner surface of the hollow cylinder 200 aligns with and interlocks with the multifaceted region or segment 110a on locking shaft 100, it fixes the angular position of pivoting element 200. Locking shaft 100 also has two internal locking areas 165a and 165b that can interlock with two retractable multifaceted locking pins or fasteners 135a and 135b whose position inside locking shaft 100 can be maintained by a spring 145. Ledges 140a and 140b at the end of each retractable multifaceted locking pin or fastener keep the retractable multifaceted locking pins or fasteners 135a and 135b from falling out of locking shaft 100. The mechanism works by sliding hollow cylinder or tube 150 that is attached to pivoting element 200 over locking shaft 100. Locking shaft 100 can then be attached to a surface or an object by compressing the retractable multifaceted locking pins or fasteners 135a and 135b into locking shaft 100 and releasing the pins once locking shaft 100 is aligned with the ribbed sockets 125a and 125b which may be imbedded into the body of a surface or an object. Sliding pivoting element 200 to the left over locking shaft 100 would lock the angular position of pivoting element 200 over locking shaft 100 by engaging and interlocking the matching multifaceted regions or segments 110a and 115a, and sliding pivoting element 200 to the right would un-mesh the matching multifaceted regions or segments 110a and 115a and enable pivoting element 200 to pivot around locking shaft 100.

Figure 12B:
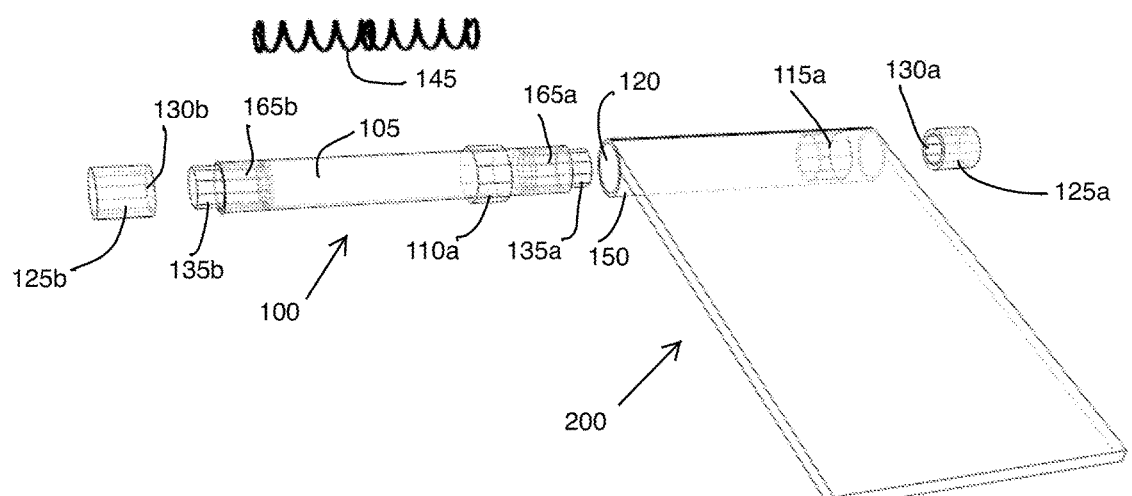
FIG. 12B illustrates a three-dimensional perspective exploded view of a non-limiting embodiment of the components of the compact bi-positional internal locking load bearing rotation lock mechanism of FIG. 12A with the multifaceted and ledged retractable fasteners positioned inside the cylindrical shaft.

FIG. 12B illustrates a three-dimensional perspective exploded view of the non-limiting embodiment of the components of FIG. 12A with the multifaceted and ledged retractable pins or fasteners 135a and 135b positioned inside locking shaft 100.

Figure 12C:
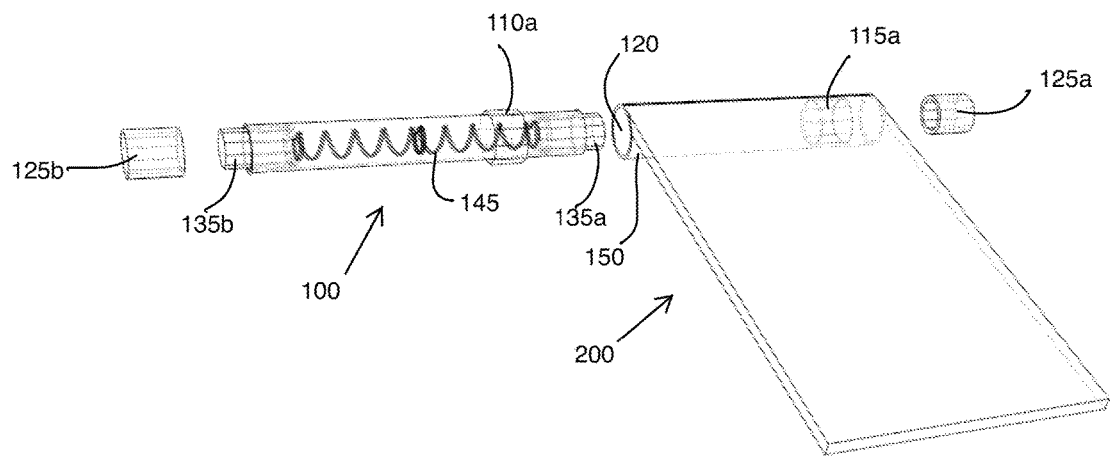
FIG. 12C illustrates a three-dimensional perspective exploded view of a non-limiting embodiment of the components of the compact bi-positional internal locking load bearing rotation lock mechanism of FIG. 12B with the spring positioned inside the cylindrical shaft and extending the multifaceted and ledged retractable fasteners outside the shaft.

FIG. 12C illustrates a three-dimensional perspective exploded view of the non-limiting embodiment of the components of FIG. 12B with the spring 145 positioned inside locking shaft 100 and extending the multifaceted and ledged retractable pins or fasteners 135a and 135b outside the shaft.

Figure 12D:
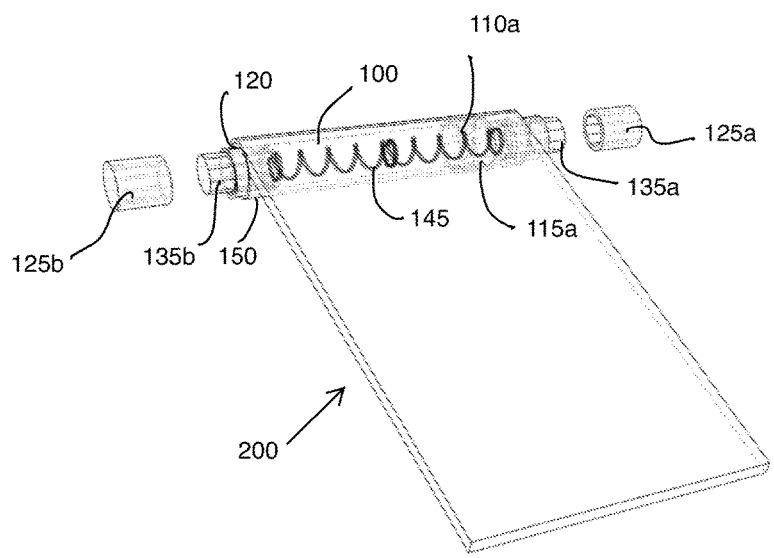
FIG. 12D illustrates a three-dimensional perspective exploded view of a non-limiting embodiment of the components of the compact bi-positional internal locking load bearing rotation lock mechanism of FIG. 12C with the pivoting element slid over the shaft.

FIG. 12D illustrates a three-dimensional perspective exploded view of a non-limiting embodiment of the components of FIG. 12C with pivoting element 200 slid over locking shaft 100.

Figure 12E:
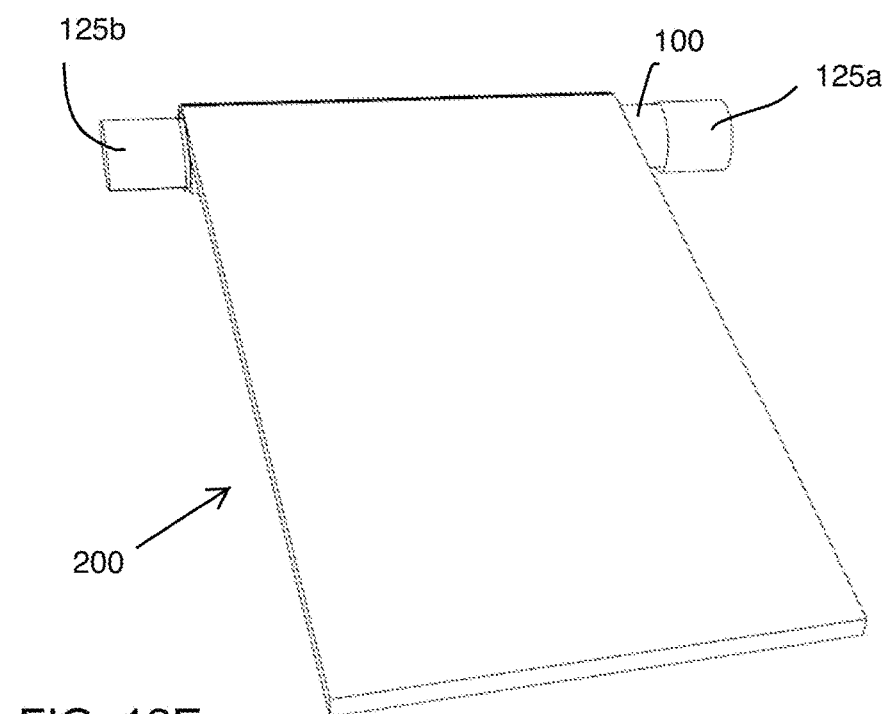
FIGS. 12E and 12F show how the shaft and its associated pivoting element can be attached to a surface or an object by compressing the multifaceted ledged retractable fasteners and releasing them once the shaft is aligned with the ribbed sockets that may positioned at both ends of a slot or a three-dimensional surface.
Figure 12F:
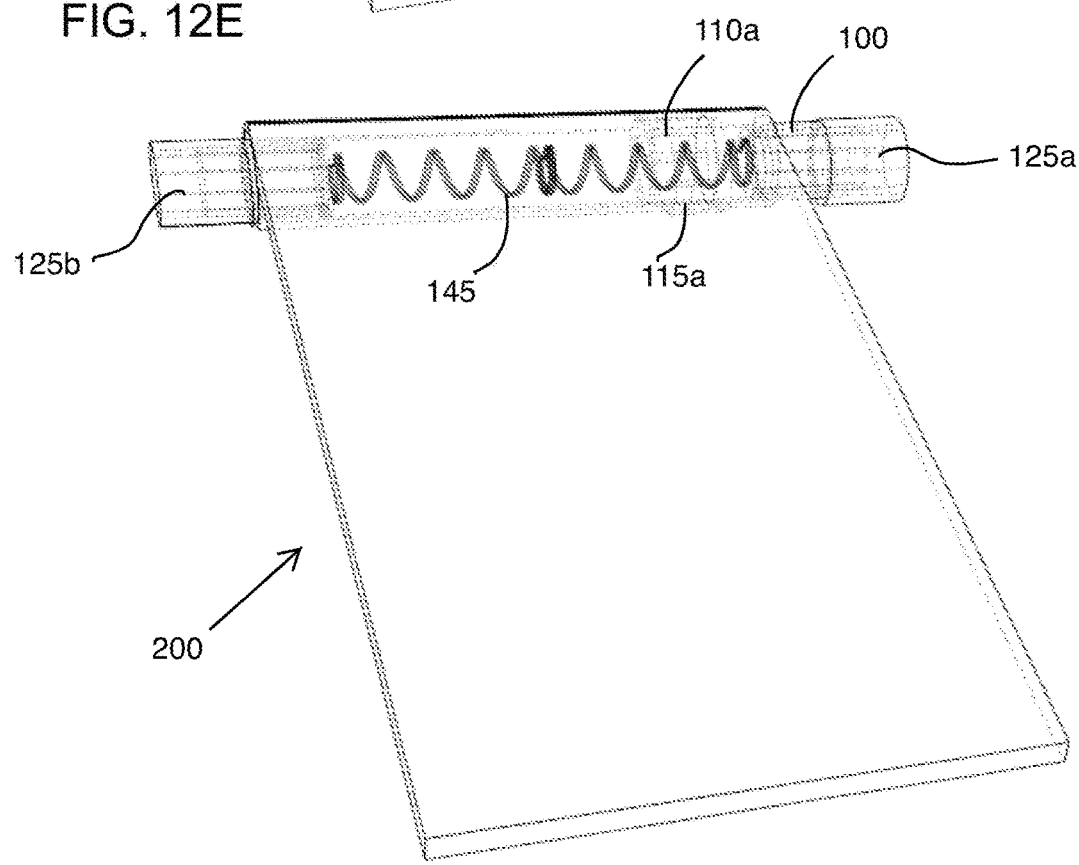

FIGS. 12E and 12F show how locking shaft 100 and its associated pivoting element 200 can be attached to a surface or an object by compressing the multifaceted ledged retractable pins or fasteners 135a and 135b and releasing them once the shaft is aligned with the ribbed sockets 125a and 125b that may be positioned at both ends of a slot or a three-dimensional surface.

Figure 12G:
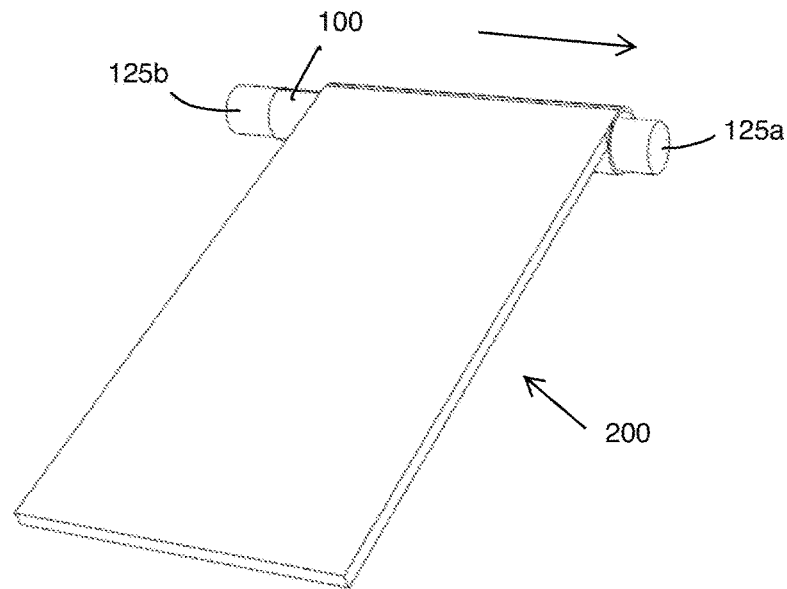
FIGS. 12G and 12H show how the pivoting element can be made to unlock from the underlying cylindrical shaft by sliding over the shaft.
Figure 12H:
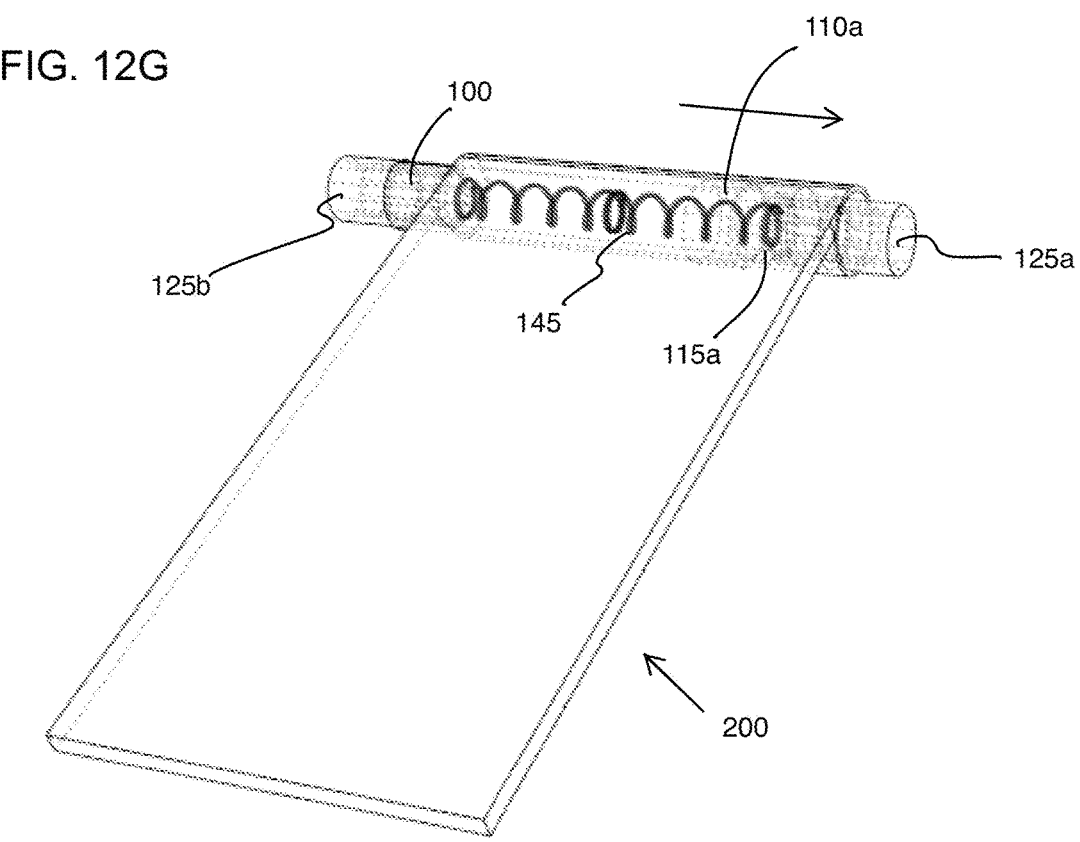

FIGS. 12G and 12H show how pivoting element 200 can be made to unlock from the underlying locking shaft 100 by sliding over the shaft.

Figure 12I:
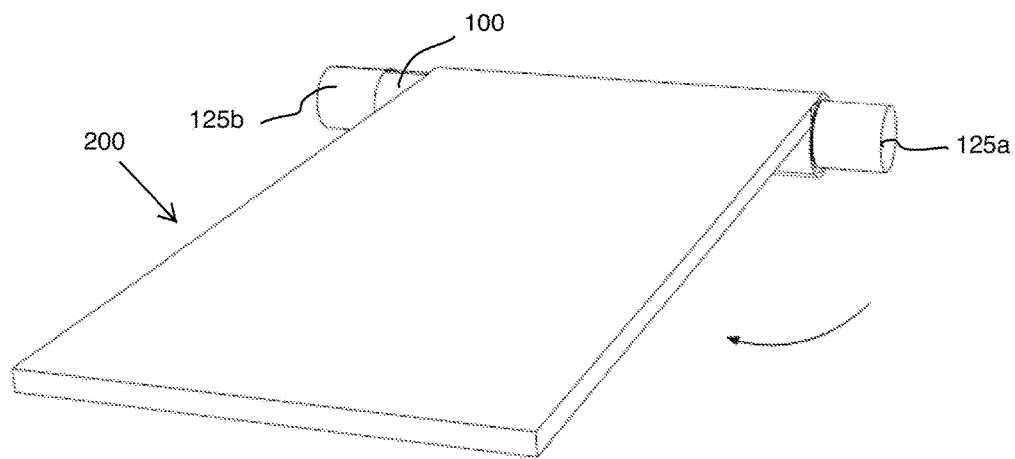
FIGS. 12I and 12J show how the pivoting element can be made to rotate around the underlying cylindrical shaft once it has been slid over the shaft.
Figure 12J:
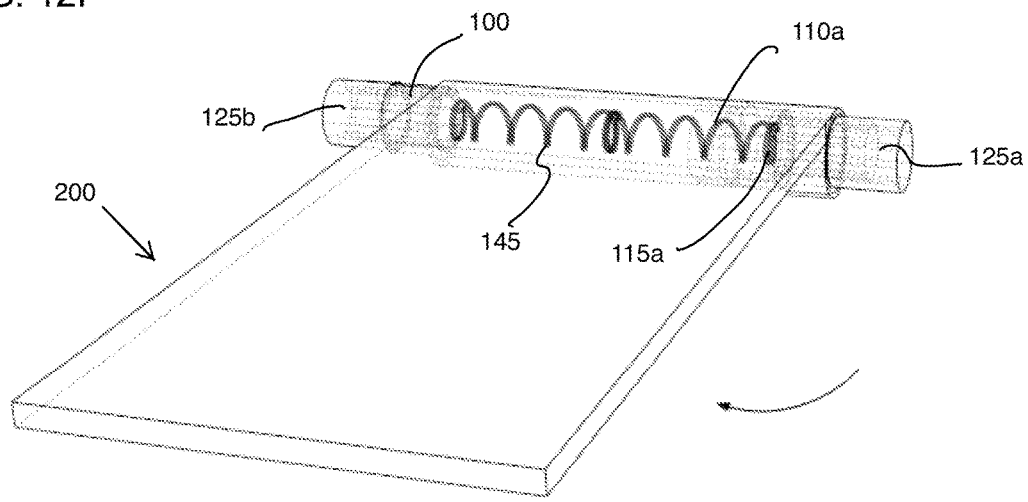

FIGS. 12I and 12J show how pivoting element 200 can be made to rotate around the underlying locking shaft 100 once it has been slid over the shaft.

Figure 13A:
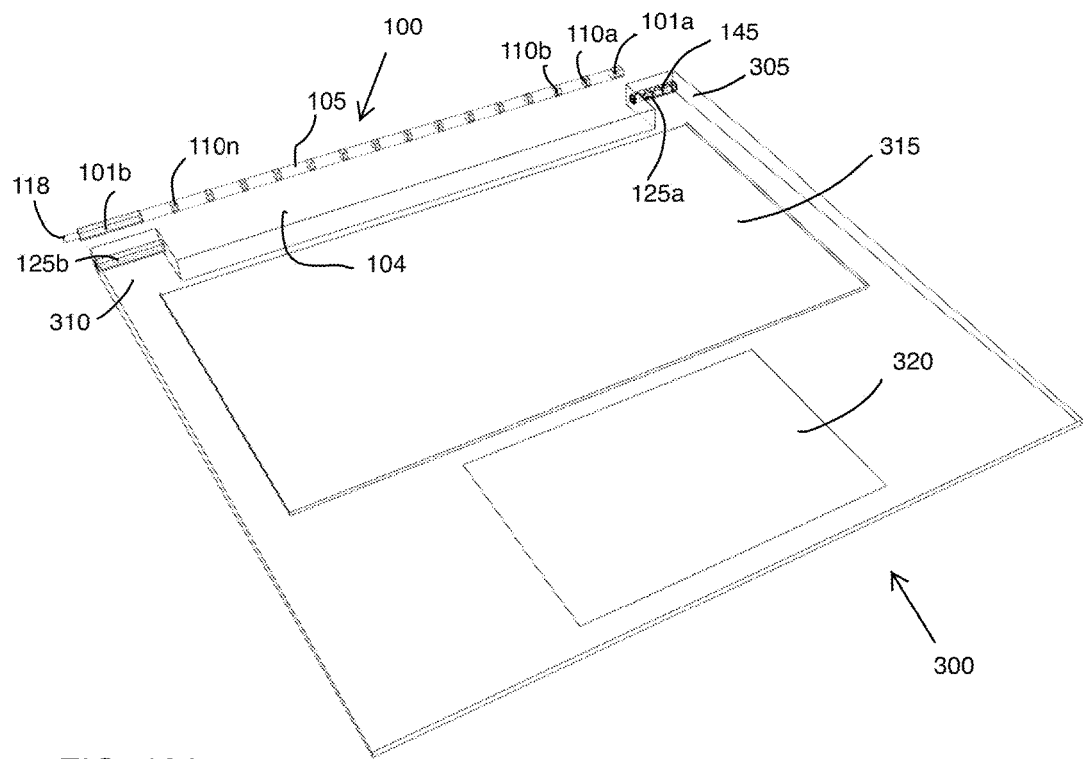
FIGS. 13A and 13B illustrate two facets of a three-dimensional perspective exploded view of a non-limiting embodiment of partial components of the compact bi-positional internal locking load bearing rotation lock mechanism as it may be implemented inside a detachable keyboard.
Figure 13B:
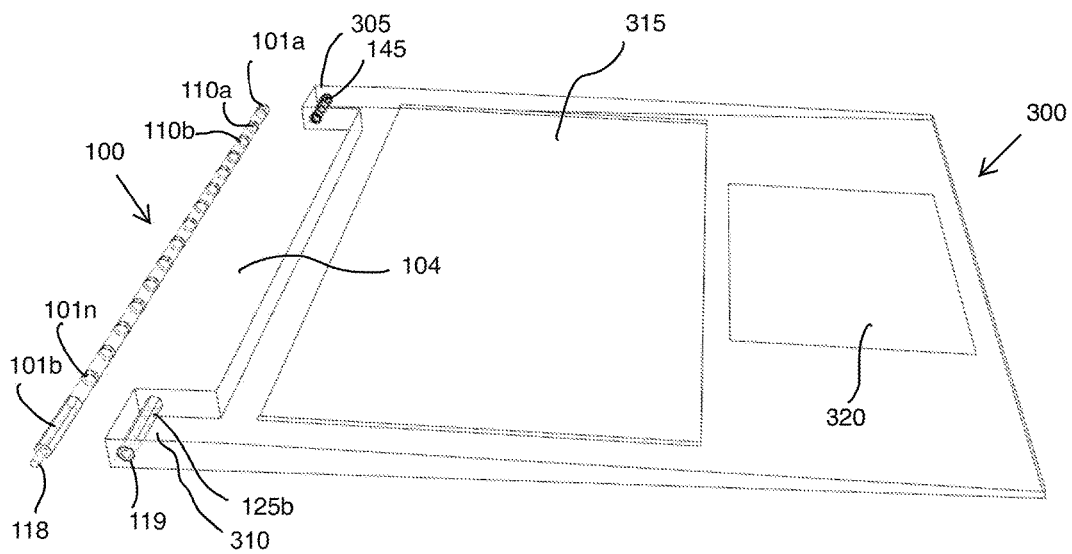

FIGS. 13A and 13B illustrate two facets of a three-dimensional perspective exploded view of a non-limiting embodiment of a compact bi-positional multi-locking load bearing rotation lock mechanism as it may be implemented inside a detachable keyboard.

FIG. 13A illustrates a three-dimensional perspective view of a partial detachable keyboard assembly showing how a locking shaft 100 with two multifaceted endings 101a and 101b and a smooth cylindrical region 105 having a first locking region consisting of a series of multifaceted regions or segments (110a)-(110n) on an outer circumference of the shaft and a release post 118 at one end of the shaft can be integrated into an exemplary non-limiting embodiment of a detachable keyboard 300. The keyboard has a keypad area 315 for data entry, a trackpad area 320 for cursor movement, and two horizontal ledges 305 and 310 extending from the left and right corners of the top area of the keyboard separated by a slot 104. The ledges 305 and 310 are traversed by two coaxial multifaceted bores 125a and 125b. The multifaceted endings 101a and 101b of locking shaft 100 are configured to match and interlock with the two coaxial multifaceted bores 125a and 125b of ledges 305 and 310 in order to tightly seat locking shaft 100 in slot 104 at the top of the keyboard. A biasing spring 145 in bore 125a urges locking shaft 100 axially along the longitudinal axis of the bores in a direction to keep the shaft's release post 118 firmly extended beyond orifice 119 of ledge 310.

FIG. 13B illustrates a three-dimensional perspective view of another facet of the partial detachable keyboard assembly of FIG. 13A highlighting how orifice 119 of ledge 310 interfaces with the release post 118 of locking shaft 100 and how it holds locking shaft 100 in place.

Figure 14A:
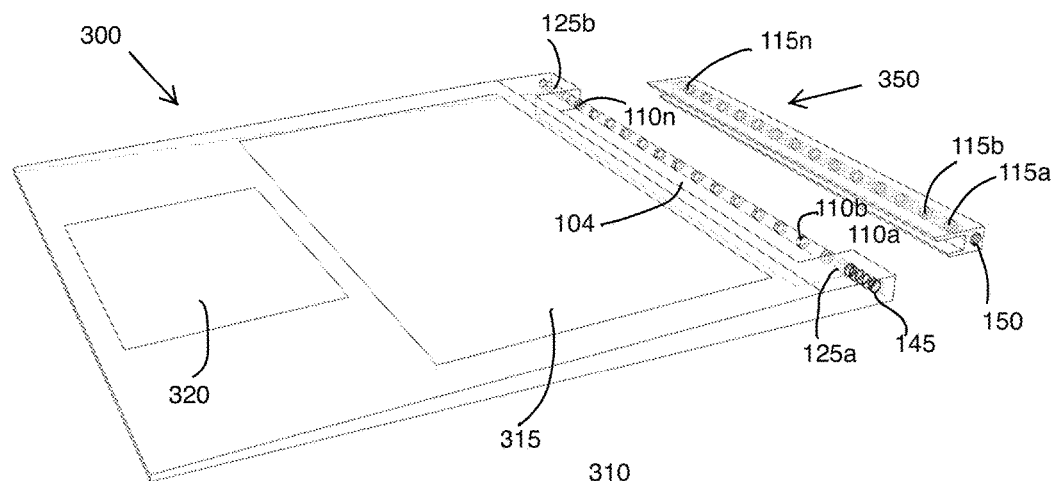
FIG. 14A illustrates a three-dimensional perspective exploded view of how a series of multifaceted regions or segments of a shaft or cylinder extending through a slot positioned at the top of a detachable keyboard may be used to integrate a holding bracket that is traversed by a hollow cylinder with matching multi-faceted regions or segments in the inner surface of the cylinder in order to form a fully formed detachable keyboard.
Figure 14B:
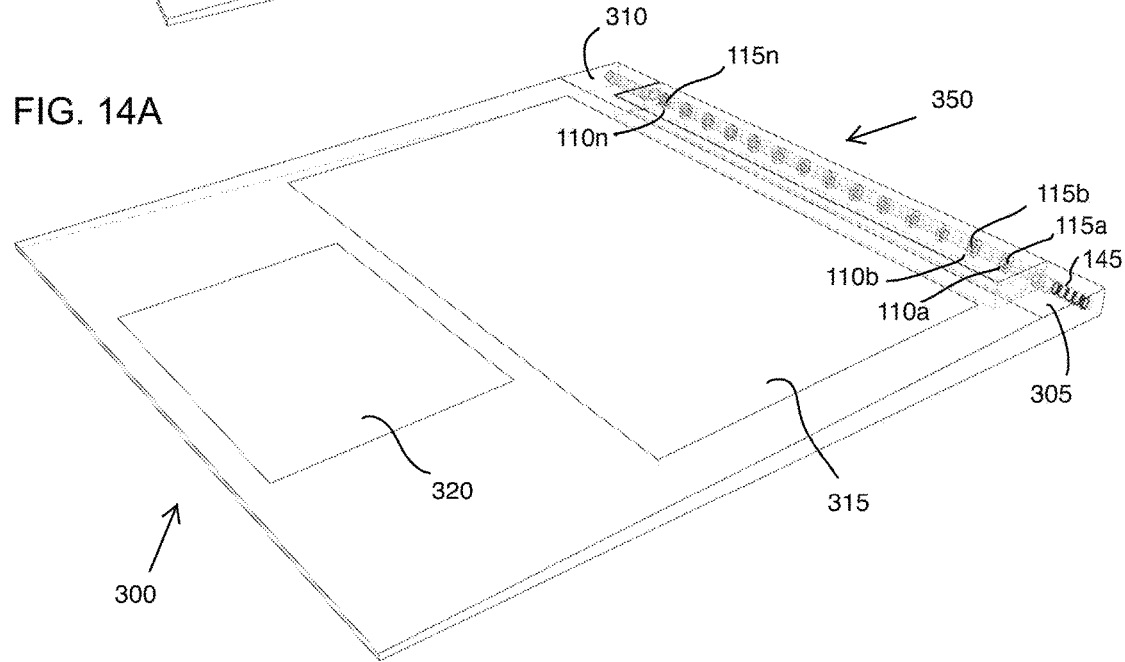
FIG. 14B illustrates a three-dimensional perspective exploded view of how a series of multifaceted regions or segments of a shaft or cylinder extending through a slot positioned at the top of a detachable keyboard can interlock with a series of matching multi-faceted regions on the inner surface of a hollow cylinder that is integrated into the holding bracket described in FIG. 14A above to lock the holding bracket in a flush configuration with rest of the surface of the keyboard and form a fully formed detachable keyboard.

FIGS. 14A and 14B illustrate a three-dimensional perspective exploded view of how locking shaft 100 of FIGS. 13A and 13B extending through slot 104 of keyboard 300 can be used to integrate a J-sharped holding bracket 350 that is traversed by a hollow cylinder 150 with a second locking region consisting of a series of multi-faceted regions or segments (115a)-(115n) in the inner surface of the cylinder in order to form a fully formed detachable keyboard.

FIG. 14A particularly illustrates how the J-shaped holding bracket 350 is designed so that it's second locking region, consisting of the multi-faceted regions or segments (115a)-(115n) of its hollow cylinder 150, can match and align with the first locking region of locking shaft 100, consisting of the multifaceted regions or segments (110a)-(110n) on the outer circumference of the shaft.

FIG. 14B particularly illustrates how the J-shaped holding bracket 350 can fully integrate with detachable keyboard 300 and how biasing spring 145 urges locking shaft 100 axially along the longitudinal axis of bores 125a and 125b in a direction to engage the first locking region of shaft 100 and the second locking region of holding bracket 350 thereby preventing holding bracket 350 from pivoting relative to locking shaft 100 in its default, uncompressed, position.

Figure 15:
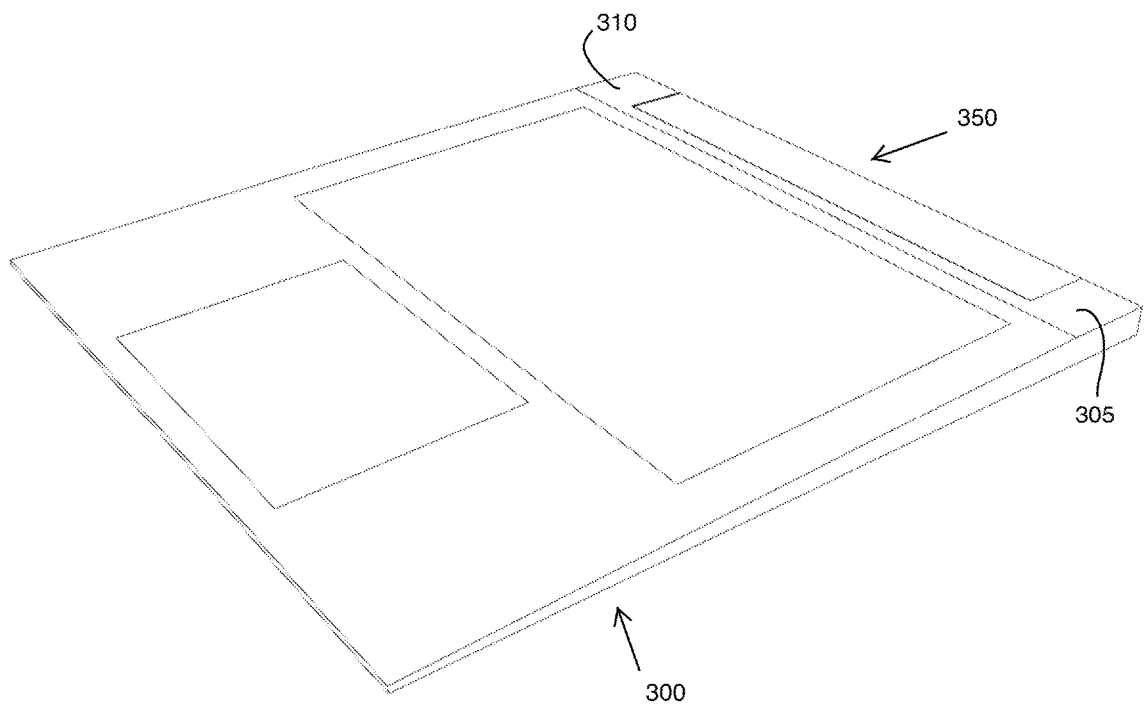
FIG. 15 illustrates a three-dimensional perspective view of a fully integrated holding bracket positioned at the top of a detachable keyboard in the flush position.

FIG. 15 illustrates a three-dimensional perspective view of a fully integrated holding bracket 350 positioned at the top of a detachable keyboard 300 in its default flush position.

Figure 16:
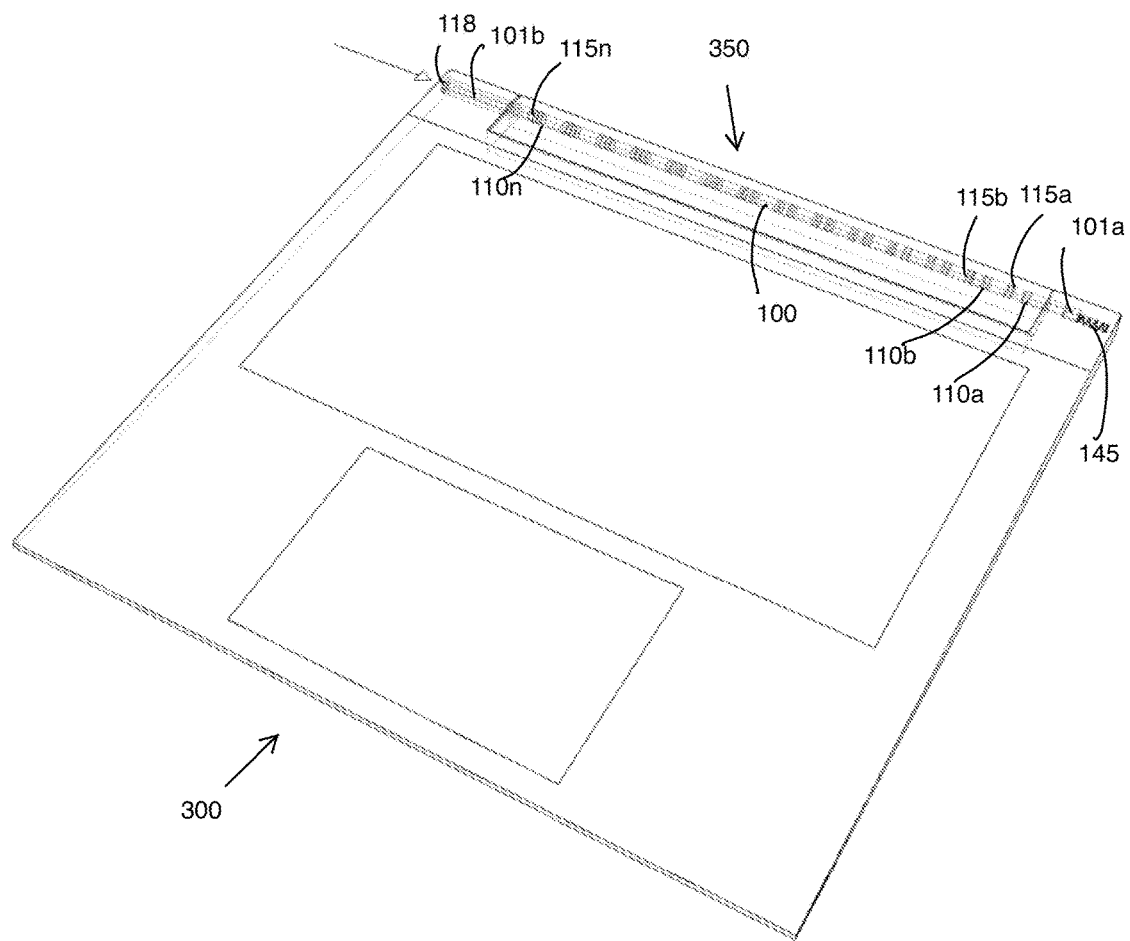
FIG. 16 illustrates a three-dimensional perspective view of how pressing a release post that urges the shaft axially along the longitudinal axis of the shaft in a direction to disengage the multifaceted regions or segments of the shaft or cylinder from the matching multi-faceted regions on the inner surface of the hollow cylinder that is integrated into the holding bracket can unlock the bracket to pivot freely around the axis of the shaft.

FIG. 16 illustrates a three-dimensional perspective view of how pressing the release post 118 of locking shaft 100 displaces the shaft axially along the longitudinal axis of the shaft in a direction to disengage the multifaceted regions or segments (110a)-(110n) of locking shaft 100 from the matching multi-faceted regions (115a)-(115n) of holding bracket 350 and unlocks the bracket to pivot freely around the axis of locking shaft 100.

Figure 17:
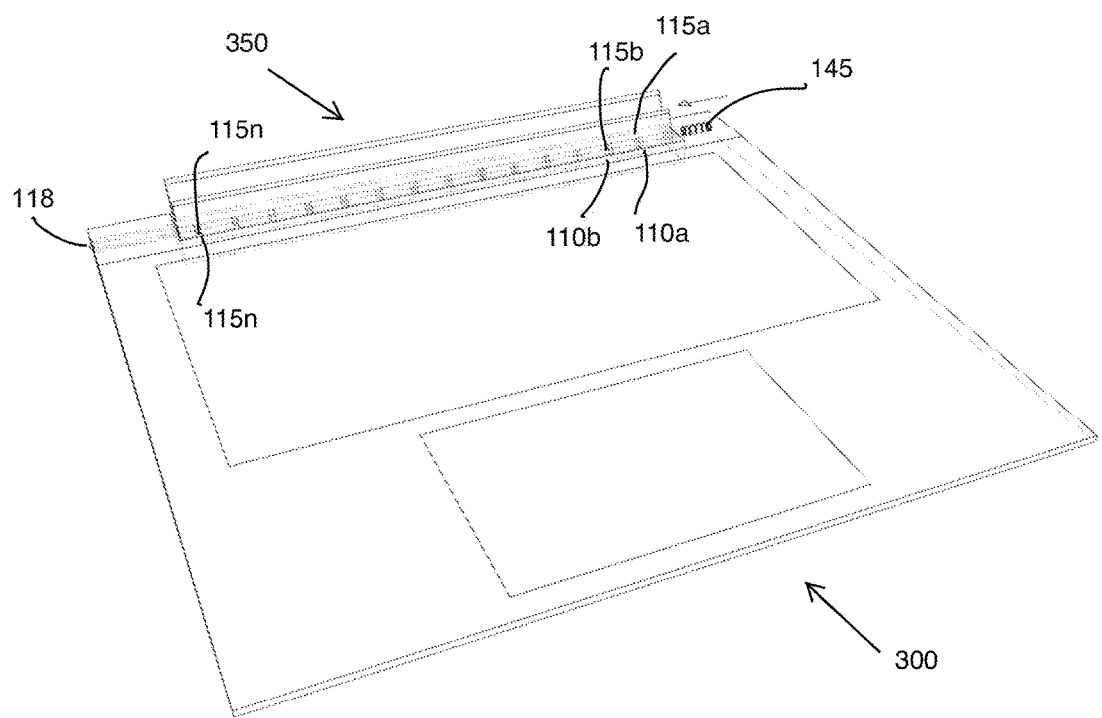
FIG. 17 illustrates a three-dimensional perspective view of the holding bracket of the detachable keyboard deployed in an upward configuration after the release post has been released and a biasing spring at the other end of the shaft has pushed the shaft back into the locked configuration.

FIG. 17 illustrates a three-dimensional perspective view of holding bracket 350 of detachable keyboard 300 deployed in an upward configuration after release post 118 has been released and biasing spring 145 has pushed locking shaft 100 back into the locked configuration with the first locking region of locking shaft 100, consisting of multifaceted regions or segments (110a)-(110n), aligning and interlocking with holding bracket 350 second locking region, consisting of multifaceted regions or segments (115a)-(115n).

Figure 18:
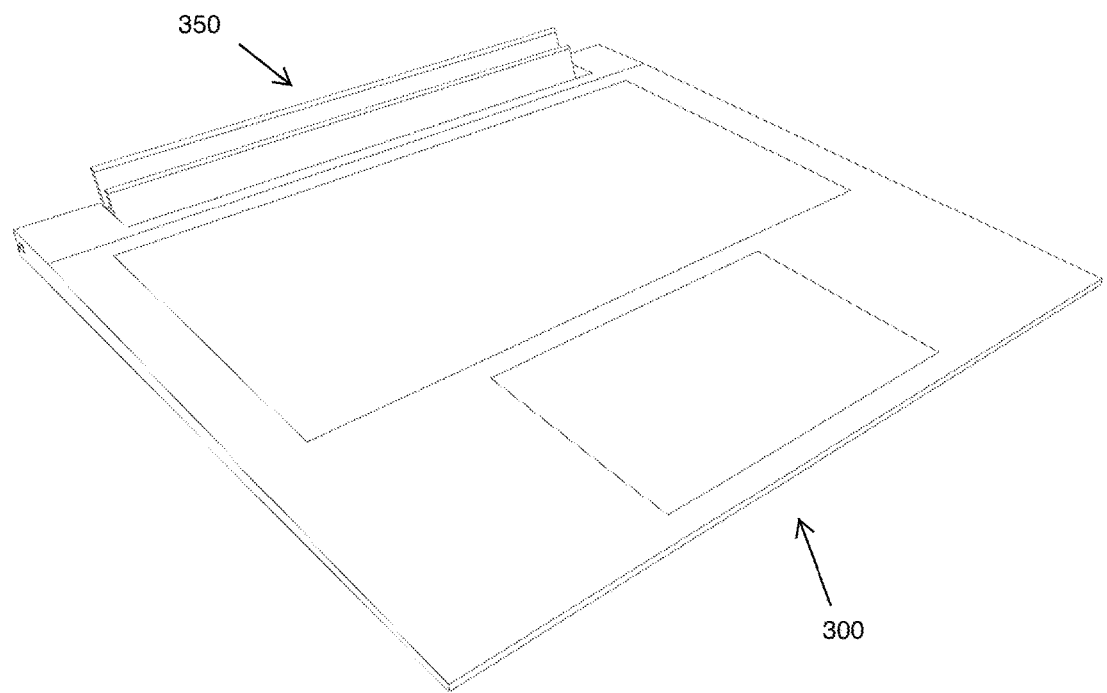
FIG. 18 illustrates a three-dimensional perspective view of a fully integrated holding bracket positioned at the top of a detachable keyboard in an upward inclined configuration.

FIG. 18 illustrates a three-dimensional perspective view of holding bracket 350 of detachable keyboard 300 in an upward inclined configuration.

Figure 19:
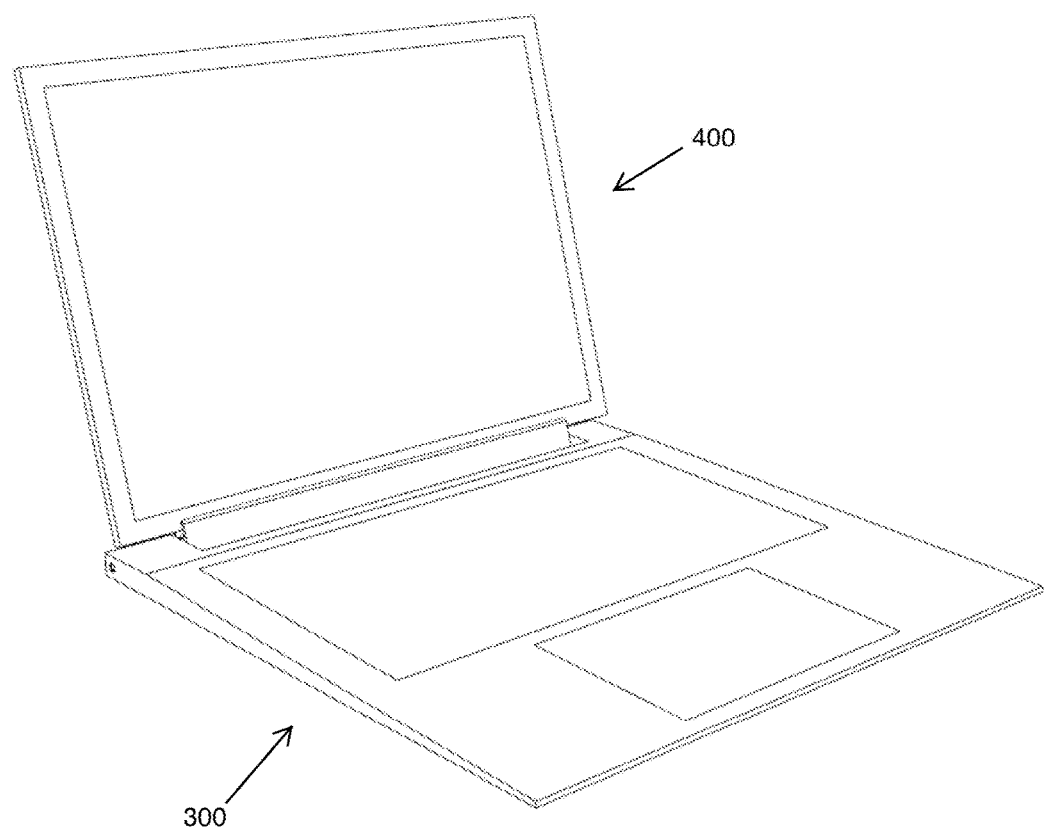
FIG. 19 illustrates a three-dimensional perspective view of a fully integrated holding bracket positioned at the top of a detachable keyboard in an upward inclined configuration and holding a tablet in the landscape orientation.

FIG. 19 illustrates a three-dimensional perspective view of holding bracket 350 of detachable keyboard 300 in an upward inclined configuration and holding a tablet 400 in the landscape orientation.

Figure 20:
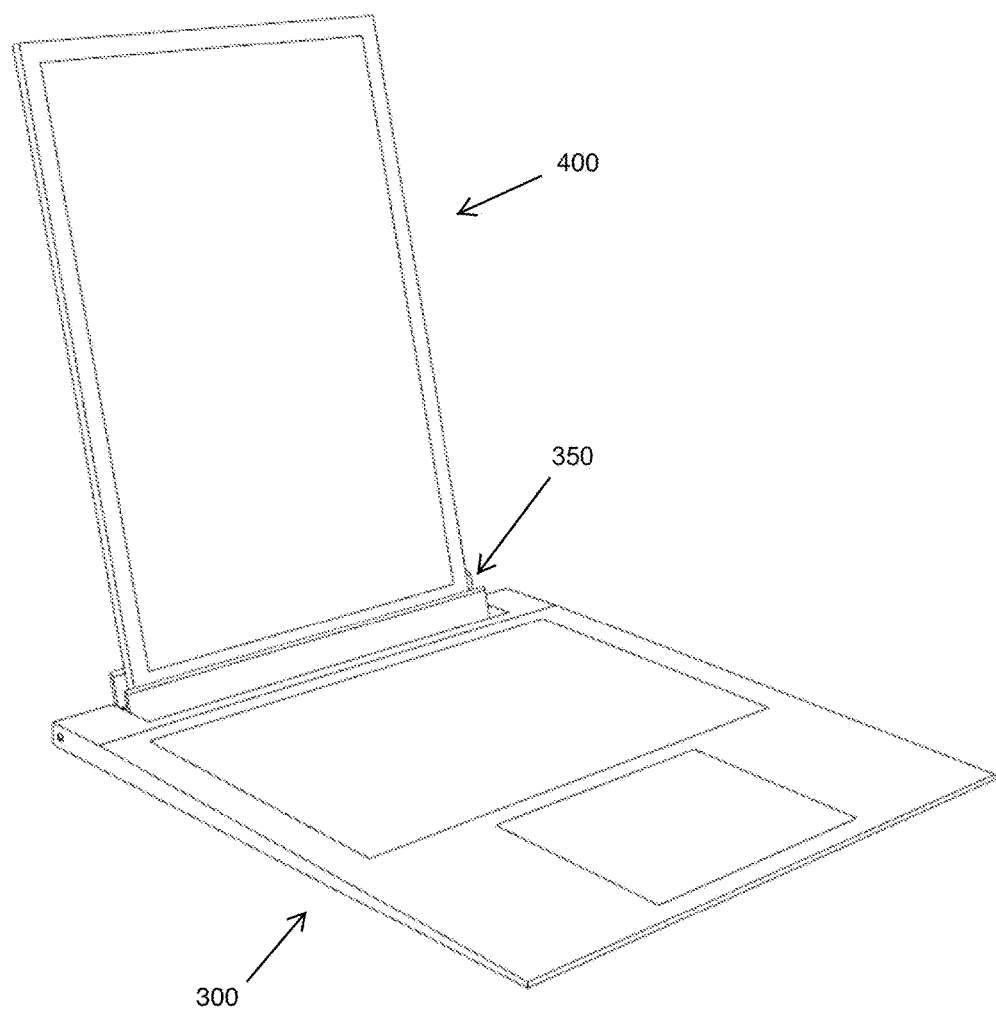
FIG. 20 illustrates a three-dimensional perspective view of a fully integrated holding bracket positioned at the top of a detachable keyboard in an upward inclined configuration and holding a tablet in the portrait orientation.

FIG. 20 illustrates a three-dimensional perspective view of holding bracket 350 of detachable keyboard 300 in an upward inclined configuration and holding a tablet in the portrait orientation.

Figure 21A:
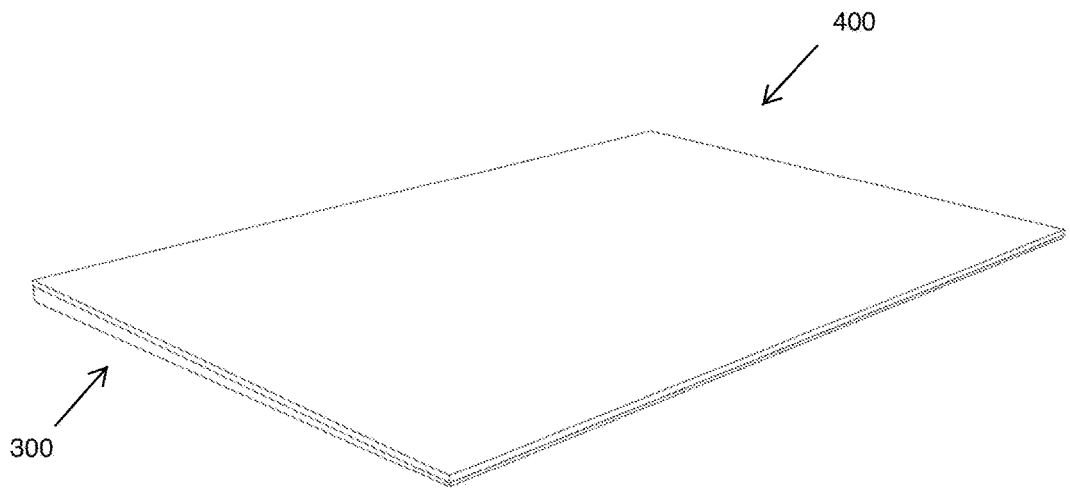
FIGS. 21A and 21B illustrate two facets of a three-dimensional perspective view of an independent tablet magnetically secured to a matching detachable keyboard in a clam configuration.
Figure 21B:
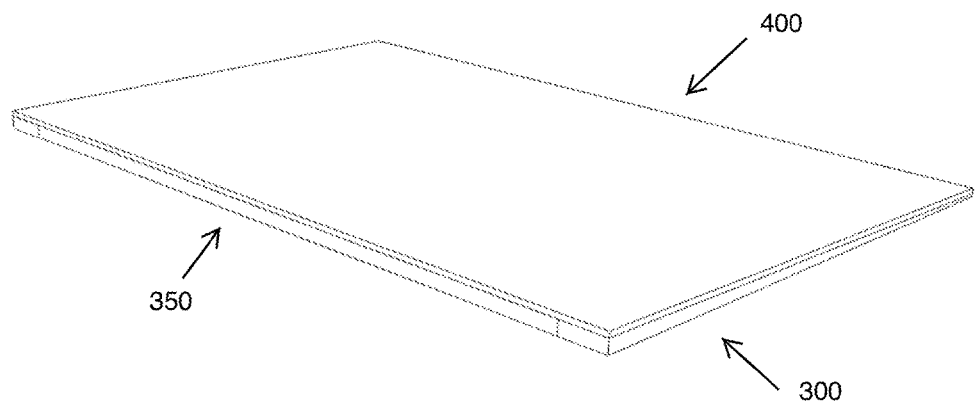
Figure 22A:
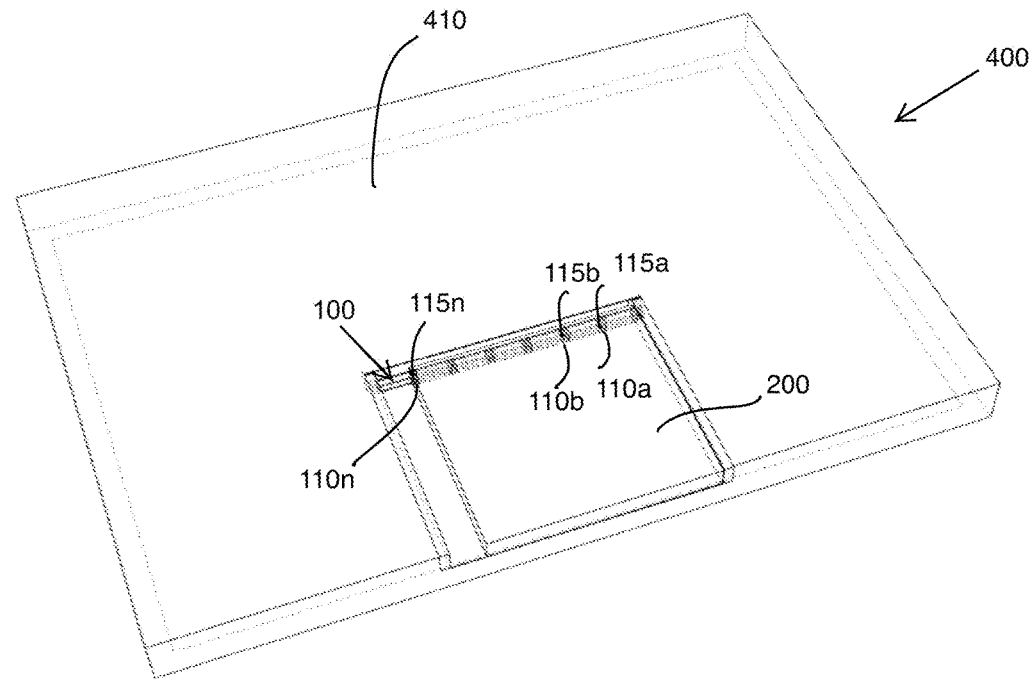
FIGS. 22A to 22D show an example flip chart animation of how the rotational position of a pivoting support element attached to a tube or hollow cylinder that incorporates a series of multifaceted locking areas in the cavity of the tube or hollow cylinder and that is located in a slot in the back of a computer tablet can be locked, unlocked, rotated, and relocked when thrust and retracted from a matching series of multifaceted regions on the outer surface area of a matching cylindrical shaft.
Figure 22B:
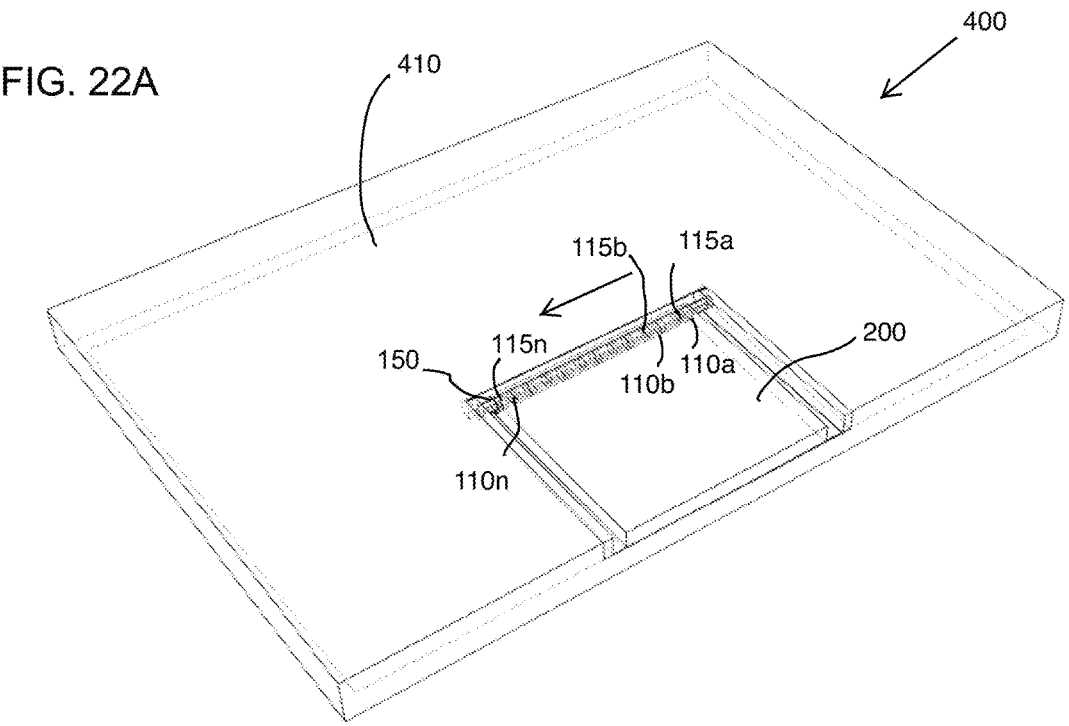
Figure 22C:
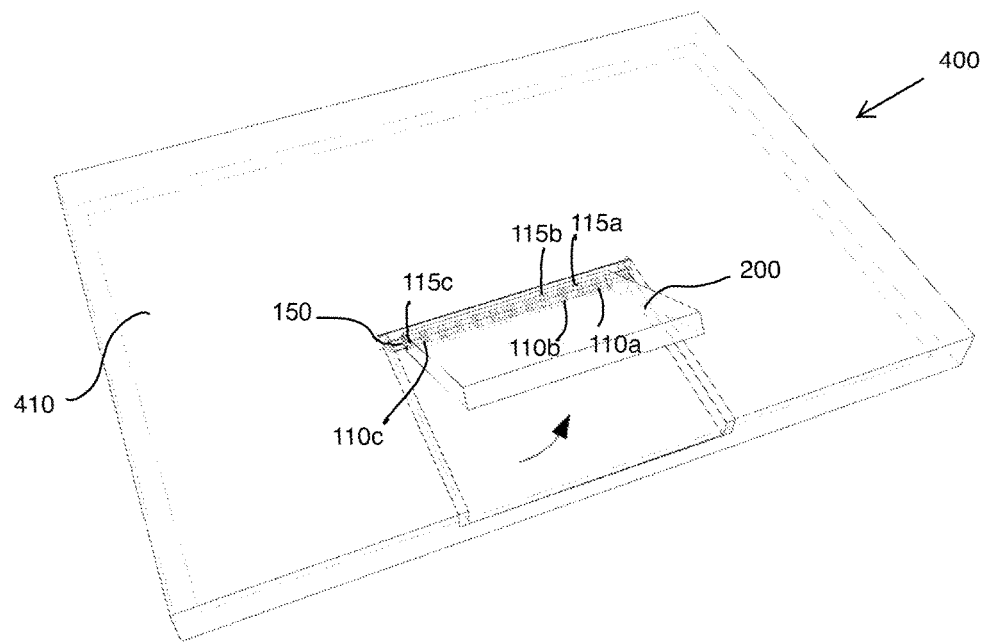
Figure 22D:
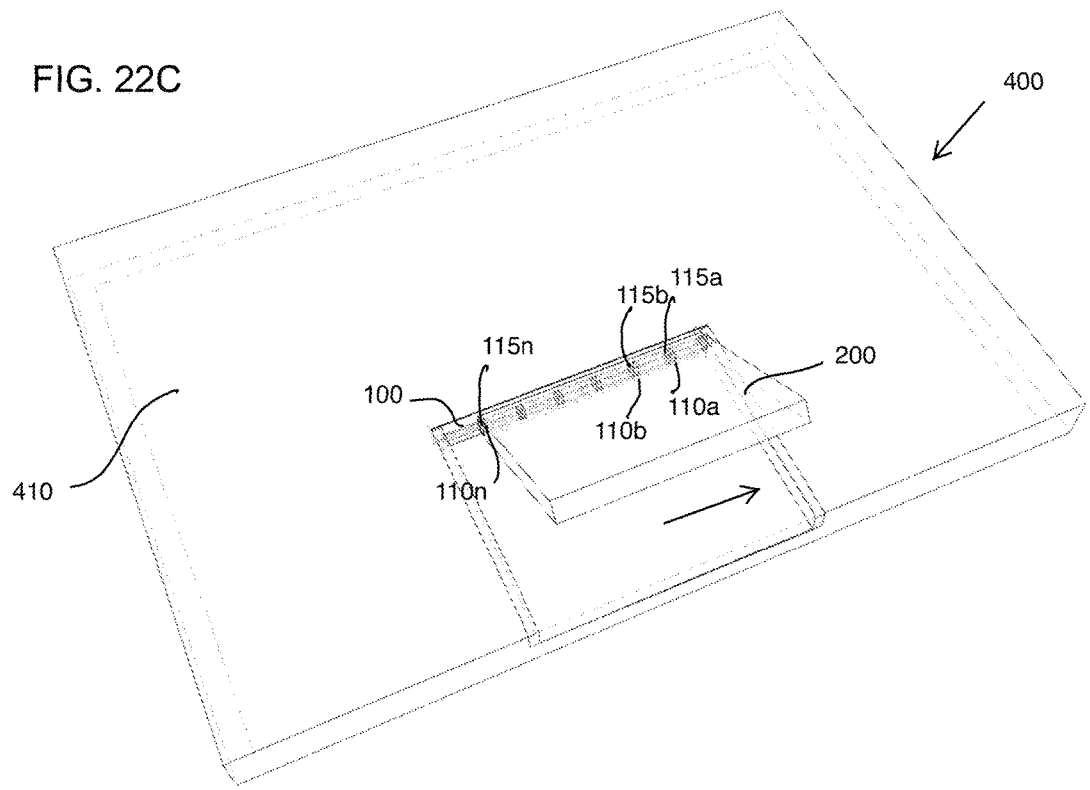

FIGS. 21A and 21B illustrate two facets of a three-dimensional perspective view of an independent tablet 400 magnetically secured to a matching detachable keyboard 300 in a clam configuration.

FIGS. 22A to 22D together are a sequence of drawings that when displayed one after another provide a flip chart animation showing how the rotational position of a pivoting support element 200 attached to a tube or hollow cylinder 150 that incorporates a series of multifaceted locking areas (115a)-(115n) in the cavity of the tube or hollow cylinder, and that is located in a slot in the back of a computer tablet 400 can be locked, unlocked, rotated, and relocked when thrust and retracted from a matching series of multifaceted regions (110a)-(110n) on the outer surface area of a locking shaft 100.

Figure 23A:
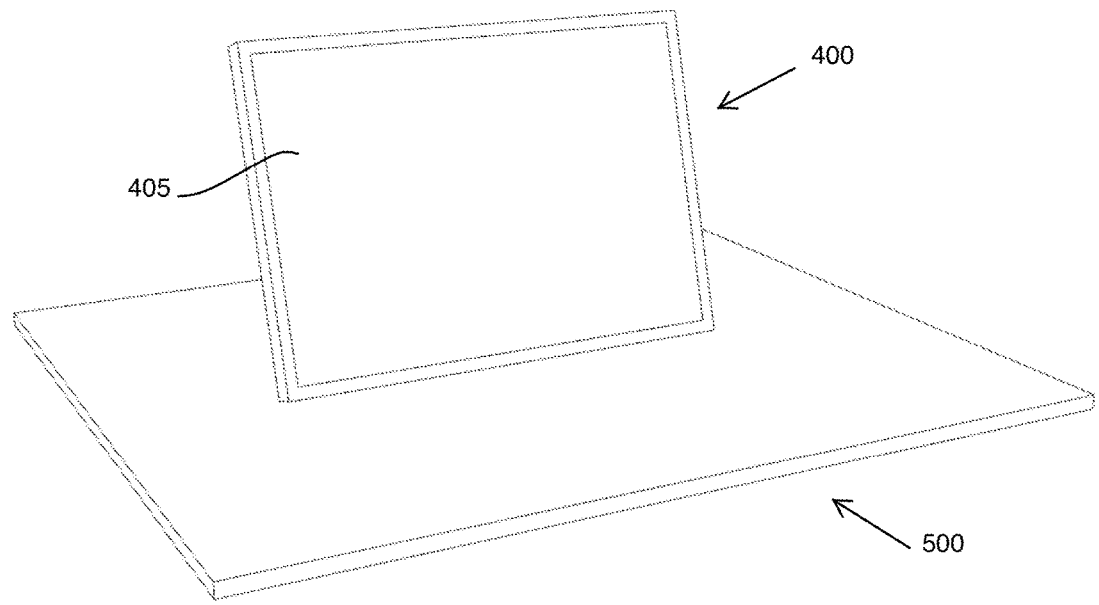
FIGS. 23A and 23B illustrate two facets of a three-dimensional perspective view of a computer tablet incorporating a compact bi-positional multi-locking load bearing rotation lock mechanism with the support element deployed at an inclined position in the landscape viewing orientation.
Figure 23B:
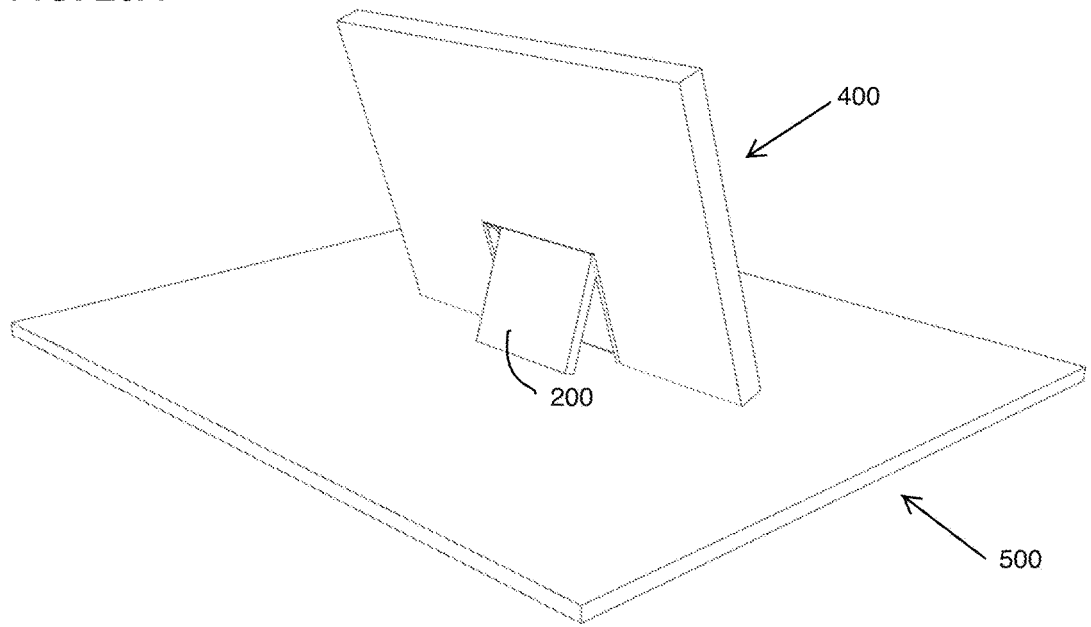

FIGS. 23A and 23B illustrate two facets of a three-dimensional perspective view of a computer tablet 400 incorporating a compact bi-positional multi-locking load bearing rotation lock mechanism with the support element 200 deployed at an inclined position in the landscape viewing orientation.

Figure 24A:
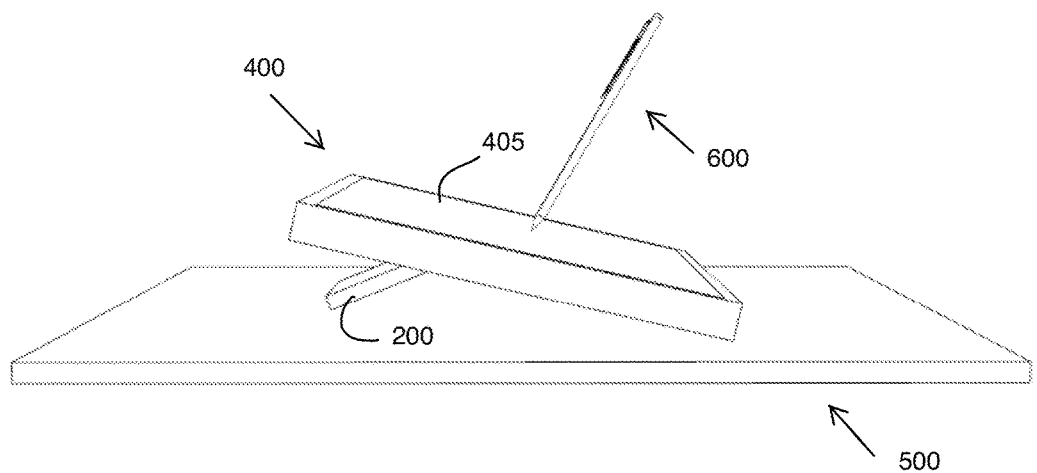
FIGS. 24A and 24B illustrate two facets of a three-dimensional perspective view of a computer tablet incorporating a compact bi-positional multi-locking load bearing rotation lock mechanism with the support element deployed at an inclined position in a landscape writing orientation.
Figure 24B:
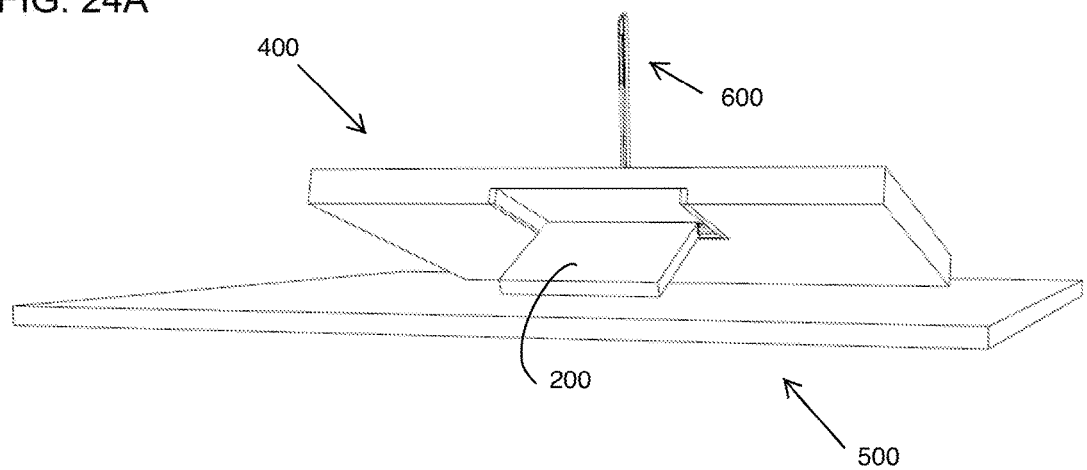

FIGS. 24A and 24B illustrate two facets of a three-dimensional perspective view of a computer tablet 400 incorporating a compact bi-positional multi-locking load bearing rotation lock mechanism with the support element 200 deployed at an inclined position in the landscape writing orientation with a pencil 600 positioned in a writing configuration on the display screen 405.

While several exemplary embodiments of the present inventions are disclosed herein, it should be understood that modifications, substitutions and alternatives may be apparent to one of ordinary skill in the art and can be made without departing from the scope of this disclosure. This disclosure is intended to cover any adaptations or variations of the exemplary embodiments. In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

I claim:

1. A hinge assembly comprising a first plate or arm including a slot;
   a second plate or arm seated in the slot of the first plate or arm and the second plate or arm comprising a middle cylindrical bore, and wherein the middle cylindrical bore and the second plate or arm that is connected to it are narrower than the width of the slot such that a gap is between a first side of the second plate or arm and a first side of the slot; the middle cylindrical bore comprising a plurality of locking regions with faceted sides or teeth on an inner circumference of the cylindrical bore; and wherein the second plate or arm pivots axially relative to the plane of the first plate or arm;
   a shaft, which extends through the slot, and around which the second plate or arm pivots axially, is secured to the first plate or arm, bridging the slot and extending through the middle cylindrical bore; the shaft comprising a plurality of locking regions with faceted sides or teeth on an outer circumference of the shaft and a plurality of non-locking regions contiguous with the plurality of locking regions, wherein the at least one plurality of non-locking regions are defined by a smooth cylindrical surface of the outer circumference of the shaft;
   wherein the second plate or arm slides along the shaft between an unlocked position and a locked position, such that:
      while in the unlocked position the multi-sided or toothed locking regions of the middle cylindrical bore are aligned with the non-locking regions of the shaft and completely disengaged from the multisided or toothed locking regions on the outer circumference of the shaft; and while in the unlocked position, the middle cylindrical bore and the second plate or arm that is connected to it are free to rotate relative to the first plate or arm; and while in the locked position the multi-sided or toothed locking regions of the middle cylindrical bore are aligned with, engage, and interlock with the multi-sided or toothed locking regions on the outer circumference of the shaft; and while in the locked position, the middle cylindrical bore and the second plate or arm that is connected to it are prevented from rotating relative to the first plate or arm.

2. The hinge assembly of claim 1 wherein the cylindrical bore included with the second plate or arm is a plurality of cylindrical bores.

3. A housing or protective casing for an electronic device comprising a back wall including a slot;

a plate or arm seated in the slot of the back wall and the plate or arm comprising a middle cylindrical bore, and wherein the middle cylindrical bore and the plate or arm that is connected to it are narrower than the width of the slot such that a gap is between a first side of the plate or arm and a first side of the slot; the middle cylindrical bore comprising a plurality of locking regions with faceted sides or teeth on an inner circumference of the cylindrical bore; and wherein the plate or arm pivots axially relative to the plane of the back wall;

a shaft, which extends through the slot, and around which the plate or arm pivots axially, is secured to the back wall, bridging the slot and extending through the middle cylindrical bore; the shaft comprising a plurality of locking regions with faceted sides or teeth on an outer circumference of the shaft and a plurality of non-locking regions contiguous with the plurality of locking regions, wherein the plurality of non-locking regions are defined by a smooth cylindrical surface of the outer circumference of the shaft;

wherein the plate or arm slides along the shaft between an unlocked position and a locked position, such that:

while in the unlocked position the multi-sided or toothed locking regions of the middle cylindrical bore are aligned with the non-locking regions of the shaft and completely disengaged from the multi-sided or toothed locking regions on the outer circumference of the shaft; and while in the unlocked position, the middle cylindrical bore and the plate or arm that is connected to it are free to rotate relative to the back wall; and while in the locked position the multi-sided or toothed locking regions of the middle cylindrical bore are aligned with, engage, and interlock with the multi-sided or toothed locking regions on the outer circumference of the shaft; and while in the locked position, the middle cylindrical bore and the plate or arm that is connected to it are prevented from rotating relative to the back wall.

4. The hinge assembly of claim 3 wherein the cylindrical bore included with the plate or arm is a plurality of cylindrical bores.

5. A hinge assembly comprising a first plate or arm including a slot and outer cylindrical bores on opposite sides of the slot, wherein the outer cylindrical bores are coaxial;

a second plate or arm seated in the slot of the first plate or arm and the second plate or arm comprising a middle cylindrical bore coaxial with the outer cylindrical bores, and the middle cylindrical bore comprising a plurality of locking regions with faceted sides or teeth on an inner circumference of the cylindrical bore and wherein the second plate or arm moves rotationally relative to the first plate or arm about a longitudinal axis defined by the outer and middle cylindrical bores;

a locking mechanism including a hinge shaft that is rotationally fixed and around which the second plate or arm pivots axially is seated inside the outer and middle cylindrical bores; extends through the middle cylindrical bore and into the outer cylindrical bores, and is configured to move axially along the longitudinal axis of the middle and outer cylindrical bores; the hinge shaft comprising a plurality of locking regions with faceted sides or teeth on an outer circumference of the shaft and a plurality of non-locking regions contiguous with the plurality of locking regions, wherein the plurality of non-locking regions are defined by a smooth cylindrical surface of the outer circumference of the shaft;

wherein the hinge shaft slides along the middle cylindrical bore between an unlocked position and a locked position, such that:

while the hinge shaft is in the unlocked position the non-locking regions of the hinge shaft are aligned with the locking regions of the middle cylindrical bore, and while the hinge shaft is in the unlocked position, the middle cylindrical bore and the second plate or arm that is connected to it are free to rotate relative to the outer cylindrical bores of the first plate or arm that is connected to them; and while the hinge shaft is in the locked position the multi-sided or toothed locking regions of the hinge shaft are partially or fully aligned with, engage with, and interlock with, the locking regions of the middle cylindrical bore, and while the hinge shaft is in the locked position, the middle cylindrical bore and the second plate or arm that is connected to it are prevented from rotating relative to the outer cylindrical bores and the first plate or arm that is connected to them; and a biasing mechanism configured to urge the hinge shaft axially along the longitudinal axis of the bores in a direction to engage and interlock the multi-sided or toothed locking regions of the hinge shaft with the multi-sided or toothed locking regions of the middle cylindrical bore, thereby preventing the first plate or arm and the second plate or arm from pivoting relative to one another; and a release post configured to be manually displaced to urge the hinge shaft axially along the longitudinal axis of the bores in a direction to disengage the multi-sided or toothed locking regions of the hinge shaft from the multi-sided or toothed locking regions of the middle cylindrical bore, thereby allowing the second plate or arm to pivot relative to the first plate or arm.

6. The hinge assembly of claim 5 wherein the biasing mechanism is a spring.

7. The hinge assembly of claim 5 wherein the biasing mechanism is a coil spring.

8. The hinge assembly of claim 5 wherein the cylindrical bore included with the second plate or arm is a plurality of cylindrical bores.

9. A keyboard comprising a slot at the top section of the keyboard and outer cylindrical bores on opposite sides of the slot, wherein the outer cylindrical bores are coaxial;

a pivoting holding bracket seated in the slot and the pivoting holding bracket comprising a middle cylindrical bore coaxial with the outer cylindrical bores; and the middle cylindrical bore comprising a plurality of locking regions with faceted sides or teeth on an inner circumference of the cylindrical bore and wherein the pivoting holding bracket moves rotationally relative to the keyboard about a longitudinal axis defined by the outer and middle cylindrical bores;

a locking mechanism including a hinge shaft that is rotationally fixed and around which the pivoting holding bracket pivots axially is seated inside the outer and middle cylindrical bores, extends through the middle cylindrical bore and into the outer cylindrical bores and is configured to move axially along the longitudinal axis of the middle and outer cylindrical bores, the hinge shaft comprising a plurality of locking regions with faceted sides or teeth on an outer circumference of the shaft and a plurality of non-locking regions contiguous with the plurality of locking regions, wherein the plurality of non-locking regions are defined by a smooth cylindrical surface of the outer circumference of the shaft;

wherein the hinge shaft slides along the middle cylindrical bore between an unlocked position and a locked position, such that:

while the hinge shaft is in the unlocked position the non-locking regions of the hinge shaft are aligned with the locking regions of the middle cylindrical bore, and while the hinge shaft is in the unlocked position, the middle cylindrical bore and the pivoting holding bracket that is connected to it are free to rotate relative to the outer cylindrical bores of the keyboard that is connected to them; and while the hinge shaft is in the locked position the multi-sided or toothed locking regions of the hinge shaft are partially or fully aligned with, engage with, and interlock with, the locking regions of the middle cylindrical bore, and while the hinge shaft is in the locked position, the middle cylindrical bore and the pivoting holding bracket that is connected to it are prevented from rotating relative to the outer cylindrical bores and the keyboard that is connected to them; and a biasing mechanism configured to urge the hinge shaft axially along the longitudinal axis of the bores in a direction to engage and interlock the plurality of multi-sided or toothed locking regions of the hinge shaft with the plurality of multi-sided or toothed locking regions of the middle cylindrical bore, thereby preventing the pivoting holding bracket and the keyboard from pivoting relative to one another; and a release post configured to be manually displaced to urge the hinge shaft axially along the longitudinal axis of the bores in a direction to disengage the plurality of multi-sided or toothed locking regions of the hinge shaft from the plurality of multi-sided or toothed locking regions of the middle cylindrical bore, thereby allowing the pivoting holding bracket to pivot relative to the keyboard.

10. The hinge assembly of claim 9 wherein the biasing mechanism is a spring.

11. The hinge assembly of claim 9 wherein the biasing mechanism is a coil spring.

12. The hinge assembly of claim 9 wherein the cylindrical bore included with-pivoting holding bracket is a plurality of cylindrical bores.

\* \* \* \* \*